(12) United States Patent
Weagle

(10) Patent No.: US 11,208,172 B2
(45) Date of Patent: Dec. 28, 2021

(54) SUSPENSION PIVOT ASSEMBLIES HAVING A RETENTION FEATURE

(71) Applicant: SPECIALIZED BICYCLE COMPONENTS, INC., Morgan Hill, CA (US)

(72) Inventor: David Weagle, Edgartown, MA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 554 days.

(21) Appl. No.: 16/153,396

(22) Filed: Oct. 5, 2018

(65) Prior Publication Data

US 2020/0108887 A1    Apr. 9, 2020

(51) Int. Cl.
*B62K 25/08*    (2006.01)
*B62K 25/28*    (2006.01)
*B62K 21/02*    (2006.01)

(52) U.S. Cl.
CPC .............. *B62K 25/08* (2013.01); *B62K 25/28* (2013.01); *B62K 21/02* (2013.01)

(58) Field of Classification Search
CPC ........ B62D 25/14; B62D 25/16; B62D 25/22; B62D 25/24; B62D 25/08; B62D 25/26; B62D 25/28; B62D 25/286; B62K 21/02; B62K 25/14; B62K 25/16; B62K 25/22; B62K 25/24; B62K 25/04; B62K 25/08; B62K 25/26; B62K 25/28; B62K 25/286; F16C 2226/62; F16J 1/18
USPC ........ 280/275, 276, 283, 284; 403/156, 161, 403/162; 411/346, 356, 395, 530, 991, 411/155, 156, 164, 161, 150
See application file for complete search history.

(56) References Cited

U.S. PATENT DOCUMENTS

| 389,200 A | 9/1888 | Clegg |
| 393,387 A | 11/1888 | Norton |
| 400,727 A | 4/1889 | Baudreau |
| 412,322 A | 10/1889 | Copeland |

(Continued)

FOREIGN PATENT DOCUMENTS

| BE | 507753 | 12/1951 |
| BE | 507753 A | 12/1951 |

(Continued)

OTHER PUBLICATIONS

Copending U.S. Appl. No. 16/125,085, filed Sep. 7, 2018.

(Continued)

*Primary Examiner* — Anne Marie M Boehler
(74) *Attorney, Agent, or Firm* — Knobbe Martens Olson & Bear, LLP

(57) ABSTRACT

A pivot assembly for a cycle linkage suspension is provided that includes first and second members and a pivot. The first and second members include lateral openings extending therethrough and the pivot includes a rod portion that is configured to be disposed within the lateral openings to pivotably couple the first and second members together. The rod portion further includes an opening that extends through an intermediate portion thereof. The pivot assembly can further include a pin configured to be removably inserted at least partially into the opening in the rod portion to thereby restrict lateral movement of the rod portion within the first and second members.

20 Claims, 12 Drawing Sheets

(56) References Cited

U.S. PATENT DOCUMENTS

| | | |
|---|---|---|
| 414,048 A | 10/1889 | Hunter |
| 423,471 A | 3/1890 | Easthope |
| 426,402 A | 4/1890 | Torkelson |
| 435,477 A | 9/1890 | Blackledge |
| 441,649 A | 12/1890 | Dunlop |
| 443,266 A * | 12/1890 | Bell |
| 444,639 A | 1/1891 | O'Neill |
| 447,234 A | 2/1891 | Donnelly |
| 467,794 A | 1/1892 | Ellis |
| 468,643 A | 2/1892 | Clement |
| 524,389 A | 8/1894 | La Casse |
| 602,354 A | 4/1898 | Ohlgart |
| 638,723 A | 12/1899 | Kelly |
| 739,476 A | 9/1903 | Becker |
| 783,236 A | 2/1905 | Ashburn |
| 848,324 A | 3/1907 | Sager |
| 913,961 A | 3/1909 | Levedahl |
| 927,989 A | 7/1909 | Meiser |
| 940,245 A | 11/1909 | Gates |
| 946,143 A | 1/1910 | Levedahl |
| 953,697 A | 4/1910 | Kuebodeaux |
| 973,071 A | 10/1910 | Redmond |
| 979,674 A | 12/1910 | Kittle et al. |
| 980,999 A | 1/1911 | Pommer |
| 989,638 A | 4/1911 | Pilgrim |
| 1,000,115 A | 8/1911 | Oquist |
| 1,036,263 A | 8/1912 | Kittle |
| 1,042,480 A | 10/1912 | Ridgway |
| 1,077,105 A | 10/1913 | Stewart |
| 1,096,417 A | 5/1914 | Ekstrom |
| 1,101,614 A | 6/1914 | Bramham |
| 1,132,829 A | 3/1915 | Cobb |
| 1,144,753 A | 6/1915 | Budroe |
| 1,166,156 A | 12/1915 | Shimmin |
| 1,189,874 A | 7/1916 | Schickel |
| 1,203,927 A | 11/1916 | Stagni |
| 1,213,995 A | 1/1917 | Anderson |
| 1,223,572 A | 4/1917 | Drew |
| 1,227,634 A | 5/1917 | Lake |
| 1,251,992 A | 1/1918 | Drew |
| 1,254,798 A | 1/1918 | Harley |
| 1,273,179 A | 7/1918 | Perry et al. |
| 1,298,958 A | 4/1919 | Johnston |
| 1,333,449 A | 3/1920 | Russell |
| 1,365,524 A | 1/1921 | Mellantine |
| 1,397,850 A | 11/1921 | Yoxall et al. |
| 1,432,376 A | 10/1922 | Wolff |
| 1,452,436 A | 4/1923 | Pullin |
| 1,475,044 A | 11/1923 | Bloom |
| 1,517,146 A | 11/1924 | Bloom |
| 1,527,133 A | 2/1925 | Harley |
| 1,605,680 A | 11/1926 | Merkel |
| 1,834,308 A | 12/1931 | Harley |
| 1,924,363 A | 8/1933 | Kanai |
| 1,924,586 A * | 8/1933 | Zerk ............... B62D 7/18 280/93.512 |
| 1,999,394 A * | 4/1935 | Burnett ............. B62D 7/18 280/93.512 |
| 2,038,011 A | 4/1936 | Spiegler et al. |
| 2,073,736 A | 3/1937 | Duffy |
| 2,087,299 A | 7/1937 | Pribil |
| 2,160,034 A | 5/1939 | Schwinn |
| 2,170,565 A * | 8/1939 | Macbeth ............ B62K 25/16 280/286 |
| 2,203,342 A | 6/1940 | Sloman |
| 2,233,313 A | 2/1941 | Hazelroth |
| 2,271,304 A | 1/1942 | Mulholland |
| 2,303,568 A | 12/1942 | McWhorter et al. |
| 2,376,788 A | 5/1945 | Latscher-Latka |
| 2,462,711 A | 2/1949 | Barnett |
| 2,463,310 A | 3/1949 | Probst |
| 2,464,326 A | 3/1949 | MacGregor |
| 2,475,774 A | 7/1949 | Benson |
| 2,485,484 A | 10/1949 | Dean |
| 2,486,430 A | 11/1949 | Moore |
| 2,489,821 A | 11/1949 | Ryder |
| 2,504,452 A | 4/1950 | Rostan |
| 2,525,171 A | 10/1950 | Franks |
| 2,537,679 A | 1/1951 | Kraeft |
| 2,540,585 A | 2/1951 | Kranz |
| 2,543,991 A | 3/1951 | Schuricht |
| 2,550,876 A | 5/1951 | Spencer |
| 2,561,156 A | 7/1951 | Thorkildsen |
| 2,588,889 A | 3/1952 | Sherwood |
| 2,596,411 A | 5/1952 | Jordan |
| 2,636,567 A | 4/1953 | Landrum |
| 2,649,312 A | 8/1953 | Miller |
| 2,660,455 A | 11/1953 | Douglas et al. |
| 2,664,644 A | 1/1954 | Tyerman |
| 2,708,112 A | 5/1955 | Seddon et al. |
| 2,729,465 A | 1/1956 | Torre |
| 2,751,991 A | 6/1956 | Mennesson |
| 2,752,167 A | 6/1956 | Propst et al. |
| 2,756,070 A | 7/1956 | Torre |
| 2,756,832 A | 7/1956 | Dalrymple |
| 2,918,306 A | 12/1959 | Lewandoski |
| 2,953,395 A | 9/1960 | Turner |
| 2,969,992 A | 1/1961 | Hahn |
| 2,976,056 A | 3/1961 | Henry |
| 3,083,038 A | 3/1963 | Moulton |
| 3,133,748 A | 5/1964 | Gunnerson |
| 3,188,072 A | 6/1965 | Wustenhagen et al. |
| 3,433,318 A | 3/1969 | Packard |
| 3,673,608 A | 6/1972 | Voorman, Jr. |
| 3,694,004 A | 9/1972 | Siebers |
| 3,701,544 A | 10/1972 | Stankovich |
| 3,730,553 A | 5/1973 | Harman |
| 3,774,935 A | 11/1973 | Aldrich |
| 3,942,821 A | 3/1976 | Bock |
| 3,944,254 A | 3/1976 | Inui |
| 3,954,284 A | 5/1976 | Phillips et al. |
| 3,989,261 A | 11/1976 | Kawaguchi |
| 4,030,641 A | 6/1977 | Bailey et al. |
| 4,057,264 A | 11/1977 | Suzuki et al. |
| 4,058,903 A | 11/1977 | Wilkerson |
| 4,147,371 A | 4/1979 | Morita et al. |
| 4,153,237 A | 5/1979 | Supalla |
| 4,159,123 A | 6/1979 | Petty |
| 4,162,797 A | 7/1979 | McBride |
| 4,170,369 A | 10/1979 | Strutman |
| 4,179,135 A | 12/1979 | Slater |
| 4,180,280 A | 12/1979 | Doveri |
| 4,184,695 A | 1/1980 | Roe et al. |
| 4,186,936 A | 2/1980 | Offenstadt et al. |
| 4,189,168 A | 2/1980 | Courtney |
| 4,212,481 A | 7/1980 | Ribi |
| 4,242,481 A | 12/1980 | Fannin |
| 4,265,329 A | 5/1981 | de Cortanze |
| 4,268,055 A | 5/1981 | Bell |
| 4,295,658 A | 10/1981 | Kashima |
| 4,367,882 A | 1/1983 | Alexander et al. |
| 4,388,978 A | 6/1983 | Fior |
| 4,401,316 A | 8/1983 | Miyakoshi et al. |
| 4,406,475 A | 9/1983 | Miyakoshi et al. |
| 4,408,399 A | 10/1983 | Darwood et al. |
| 4,410,196 A | 10/1983 | Ribi |
| 4,421,337 A | 12/1983 | Pratt |
| 4,422,662 A | 12/1983 | Inoue et al. |
| 4,433,850 A | 2/1984 | Miyakoshi et al. |
| 4,433,851 A | 2/1984 | Miyakoshi et al. |
| 4,437,678 A | 3/1984 | Schultz |
| 4,438,909 A | 3/1984 | Matsumoto |
| 4,444,406 A | 4/1984 | Isono |
| 4,455,032 A | 6/1984 | Kajikawa |
| 4,480,711 A | 11/1984 | Satoh et al. |
| 4,520,892 A | 6/1985 | Satoh |
| 4,526,249 A | 7/1985 | Parker |
| 4,531,755 A | 7/1985 | Isono et al. |
| 4,533,153 A | 8/1985 | Tsunoda et al. |
| 4,540,190 A | 9/1985 | Moulton |
| 4,542,910 A | 9/1985 | Watanabe |
| 4,561,669 A | 12/1985 | Simons |
| 4,570,963 A | 2/1986 | Isono |
| 4,572,534 A | 2/1986 | Heyl |

(56) References Cited

U.S. PATENT DOCUMENTS

| | | |
|---|---|---|
| 4,576,393 A | 3/1986 | Moulton et al. |
| 4,585,245 A | 4/1986 | Rose |
| 4,616,810 A | 10/1986 | Richardson et al. |
| 4,625,985 A | 12/1986 | Nakano et al. |
| 4,650,027 A | 3/1987 | de Cortanze |
| 4,660,683 A | 4/1987 | Hayashi et al. |
| 4,685,694 A | 8/1987 | Kouyama |
| 4,702,338 A | 10/1987 | Trema |
| 4,703,839 A | 11/1987 | Yasuo et al. |
| 4,723,621 A | 2/1988 | Kawano et al. |
| 4,732,241 A | 3/1988 | Yoshida |
| 4,738,468 A | 4/1988 | Baron |
| 4,741,545 A | 5/1988 | Honma et al. |
| 4,742,884 A | 5/1988 | Ishikawa |
| 4,744,434 A | 5/1988 | Miyakoshi et al. |
| 4,770,434 A | 9/1988 | Pietro et al. |
| 4,775,163 A | 10/1988 | McGowan et al. |
| 4,776,609 A | 10/1988 | Pan et al. |
| 4,789,174 A | 12/1988 | Lawwill |
| 4,807,898 A | 2/1989 | Huntly |
| 4,809,802 A | 3/1989 | Seino et al. |
| 4,815,763 A | 3/1989 | Hartmann |
| 4,828,069 A | 5/1989 | Hatsuyama |
| 4,834,412 A | 5/1989 | Trema |
| 4,878,558 A | 11/1989 | Asakura |
| 4,881,750 A | 11/1989 | Hartmann |
| 4,890,857 A | 1/1990 | de Cortanze |
| 4,971,344 A | 11/1990 | Turner |
| 4,993,734 A | 2/1991 | Trema |
| 4,997,197 A | 3/1991 | Shultz |
| 5,009,451 A | 4/1991 | Hayashi et al. |
| 5,042,608 A | 8/1991 | Horiike et al. |
| 5,050,699 A | 9/1991 | Savard |
| 5,064,212 A | 11/1991 | Yun |
| 5,069,303 A | 12/1991 | Fuller |
| 5,069,467 A | 12/1991 | Claudio |
| 5,088,705 A | 2/1992 | Tsai |
| 5,133,223 A | 7/1992 | Morri |
| 5,156,231 A | 10/1992 | Trema |
| 5,186,481 A | 2/1993 | Turner |
| 5,193,832 A | 3/1993 | Wilson et al. |
| 5,193,833 A | 3/1993 | Reisinger |
| 5,195,766 A | 3/1993 | Dohrmann et al. |
| 5,219,211 A | 6/1993 | Tsuchida et al. |
| 5,248,159 A | 9/1993 | Moore |
| 5,249,650 A | 10/1993 | Tanaka |
| 5,269,549 A | 12/1993 | Wilson et al. |
| 5,284,352 A | 2/1994 | Chen |
| 5,299,820 A * | 4/1994 | Lawwill ............... B62K 25/24 280/277 |
| 5,308,099 A | 5/1994 | Browning |
| 5,310,203 A | 5/1994 | Chen |
| 5,320,374 A | 6/1994 | Farris et al. |
| 5,328,196 A | 7/1994 | Ohma |
| 5,350,185 A | 9/1994 | Robinson |
| 5,354,085 A | 10/1994 | Gally |
| 5,359,910 A | 11/1994 | Chang et al. |
| 5,361,864 A | 11/1994 | Tanaka |
| 5,380,026 A | 1/1995 | Robinson |
| 5,403,028 A | 4/1995 | Trimble |
| 5,405,159 A | 4/1995 | Klein et al. |
| 5,409,248 A | 4/1995 | Williams |
| 5,413,368 A | 5/1995 | Pong et al. |
| 5,417,446 A | 5/1995 | Pileggi |
| 5,427,208 A | 6/1995 | Motobu et al. |
| 5,427,397 A | 6/1995 | Chonan |
| 5,429,380 A | 7/1995 | Lawwill |
| 5,431,426 A | 7/1995 | Ijams et al. |
| 5,441,291 A | 8/1995 | Girvin, III |
| 5,449,155 A | 9/1995 | Mack |
| 5,456,480 A | 10/1995 | Turner et al. |
| 5,462,302 A | 10/1995 | Leitner |
| 5,487,223 A | 1/1996 | Krane |
| D368,054 S | 3/1996 | Behrens et al. |
| 5,498,013 A | 3/1996 | Hwang |
| 5,509,674 A | 4/1996 | Browning |
| 5,509,676 A | 4/1996 | Fukutake et al. |
| 5,564,534 A | 10/1996 | Toyoda et al. |
| 5,599,034 A | 2/1997 | Brigden |
| 5,615,756 A | 4/1997 | Grundei et al. |
| 5,709,399 A * | 1/1998 | Smith, Jr. ............... B62D 7/18 280/93.512 |
| 5,720,473 A | 2/1998 | Thomas |
| 5,743,547 A | 4/1998 | Voss et al. |
| 5,743,574 A | 4/1998 | Kohn |
| 5,749,590 A | 5/1998 | Roerig |
| 5,782,313 A | 7/1998 | Kurawaki et al. |
| 5,799,963 A | 9/1998 | Berkmann |
| 5,813,684 A | 9/1998 | Baron |
| 5,829,773 A | 11/1998 | Rajaee |
| 5,855,388 A | 1/1999 | Brewer |
| 5,899,478 A | 5/1999 | Woodside |
| 5,908,200 A | 6/1999 | Stewart |
| 5,927,741 A * | 7/1999 | Chi ....................... B62K 25/30 280/275 |
| 5,931,487 A | 8/1999 | Koppelberg et al. |
| 5,931,489 A | 8/1999 | Damman et al. |
| 5,951,033 A | 9/1999 | Winter et al. |
| 6,017,047 A | 1/2000 | Hoose |
| 6,036,211 A | 3/2000 | Nohr |
| 6,047,981 A | 4/2000 | Burrows |
| 6,089,585 A | 7/2000 | Theobald |
| 6,149,173 A | 11/2000 | Bynoe |
| 6,152,472 A * | 11/2000 | Woodside ............. B62K 25/16 280/276 |
| 6,155,370 A | 12/2000 | Iwai et al. |
| 6,161,858 A * | 12/2000 | Tseng ................. B62K 25/286 280/281.1 |
| 6,164,424 A | 12/2000 | Girvin et al. |
| 6,164,675 A | 12/2000 | Pickering |
| 6,199,885 B1 | 3/2001 | Seidl |
| 6,241,391 B1 | 6/2001 | Hoose |
| 6,244,609 B1 | 6/2001 | Wilson |
| 6,260,869 B1 | 7/2001 | Hanlon et al. |
| 6,260,870 B1 | 7/2001 | Fan |
| 6,263,994 B1 | 7/2001 | Eitel |
| 6,336,647 B1 | 1/2002 | Iwai et al. |
| 6,357,775 B1 | 3/2002 | Iwai et al. |
| 6,371,263 B1 | 4/2002 | Hoose |
| 6,382,374 B1 | 5/2002 | Iwai et al. |
| 6,386,567 B1 | 5/2002 | Schonfeld |
| 6,402,175 B1 | 6/2002 | Jansson |
| 6,457,732 B2 | 10/2002 | Ito et al. |
| 6,485,043 B2 | 11/2002 | Ito et al. |
| 6,488,300 B2 | 12/2002 | Ito et al. |
| 6,517,095 B1 | 2/2003 | Lansac et al. |
| 6,517,096 B2 | 2/2003 | Yih |
| 6,533,305 B1 | 3/2003 | Falk |
| 6,783,140 B1 * | 8/2004 | Huang ................. B62K 25/24 280/276 |
| 6,789,810 B2 | 9/2004 | Strong |
| 6,896,276 B1 | 5/2005 | Sparrow |
| 6,908,092 B2 | 6/2005 | Kofuji et al. |
| 6,910,702 B2 | 6/2005 | Hals |
| 6,918,605 B2 | 7/2005 | Wada et al. |
| 6,994,365 B2 | 2/2006 | Kofuji |
| 7,011,325 B2 | 3/2006 | Kinzler et al. |
| 7,047,831 B2 | 5/2006 | Reynolds et al. |
| 7,140,627 B2 | 11/2006 | Wimmer |
| 7,159,883 B2 | 1/2007 | Mydlarz |
| 7,210,695 B2 | 5/2007 | Griffiths |
| 7,331,594 B2 | 2/2008 | Wimmer |
| 7,350,787 B2 | 4/2008 | Voss |
| 7,364,178 B2 | 4/2008 | Wimmer |
| 7,425,008 B2 | 9/2008 | Pokrywka |
| 7,425,009 B2 | 9/2008 | Namazue et al. |
| 7,434,823 B2 | 10/2008 | Robinson et al. |
| 7,441,622 B2 | 10/2008 | Costa |
| 7,635,141 B2 | 12/2009 | O'Connor |
| 7,699,330 B2 | 4/2010 | Chen |
| 7,708,296 B2 | 5/2010 | Becker et al. |
| 7,744,107 B2 | 6/2010 | Chen |
| 7,887,077 B2 | 2/2011 | Thiers |
| 7,896,379 B2 | 3/2011 | Nagao et al. |

(56) References Cited

U.S. PATENT DOCUMENTS

| | | | |
|---|---|---|---|
| 8,333,528 B2 * | 12/2012 | Oertley | F16J 15/344 |
| | | | 403/154 |
| 8,448,970 B1 | 5/2013 | Vardon | |
| 8,534,692 B2 | 9/2013 | Trebichavsky | |
| 8,939,458 B2 | 1/2015 | Nesbitt, III | |
| 9,248,883 B2 | 2/2016 | D'Aluisio | |
| 9,278,598 B2 | 3/2016 | Galasso et al. | |
| 9,707,817 B1 | 7/2017 | Arnott et al. | |
| 10,099,743 B2 | 10/2018 | Walthert et al. | |
| 10,196,106 B1 | 2/2019 | Weagle | |
| 10,300,979 B2 | 5/2019 | Weagle | |
| 10,308,312 B2 | 6/2019 | Weagle | |
| D859,125 S | 9/2019 | Weagle et al. | |
| D860,061 S | 9/2019 | Weagle et al. | |
| D860,062 S | 9/2019 | Weagle | |
| D861,542 S | 10/2019 | Weagle | |
| 10,518,836 B2 | 12/2019 | Weagle | |
| 10,518,839 B2 | 12/2019 | Weagle | |
| 10,526,039 B2 | 1/2020 | Weagle | |
| 10,526,040 B2 | 1/2020 | Weagle | |
| 10,537,790 B2 | 1/2020 | Galasso et al. | |
| 10,549,812 B2 | 2/2020 | Weagle | |
| 10,549,813 B2 | 2/2020 | Weagle | |
| 10,549,815 B2 | 2/2020 | Weagle | |
| D880,369 S | 4/2020 | Weagle | |
| D880,370 S | 4/2020 | Weagle | |
| D880,371 S | 4/2020 | Weagle | |
| D880,372 S | 4/2020 | Weagle | |
| 10,689,061 B2 | 6/2020 | Weagle | |
| 2001/0019197 A1 | 9/2001 | Ito et al. | |
| 2002/0005066 A1 | 1/2002 | Tanner et al. | |
| 2002/0079670 A1 | 6/2002 | Yih | |
| 2002/0084619 A1 | 7/2002 | Odom | |
| 2004/0036250 A1 | 2/2004 | Kofuji | |
| 2005/0248119 A1 | 11/2005 | Callahan et al. | |
| 2008/0023934 A1 | 1/2008 | van Houweling | |
| 2008/0041681 A1 | 2/2008 | Shipman | |
| 2008/0060863 A1 | 3/2008 | Iizuka | |
| 2008/0258424 A1 | 10/2008 | Paul | |
| 2008/0277848 A1 | 11/2008 | Davis | |
| 2008/0296863 A1 | 12/2008 | Heyl et al. | |
| 2008/0303242 A1 | 12/2008 | O'Connor | |
| 2009/0033009 A1 | 2/2009 | Kirchner et al. | |
| 2009/0266656 A1 | 10/2009 | Murakami | |
| 2010/0010709 A1 | 1/2010 | Song | |
| 2010/0244340 A1 | 9/2010 | Wootten et al. | |
| 2011/0012321 A1 | 1/2011 | Chen | |
| 2011/0083930 A1 | 4/2011 | Laird et al. | |
| 2012/0228850 A1 * | 9/2012 | Tseng | B62K 25/286 |
| | | | 280/283 |
| 2012/0248666 A1 | 10/2012 | DeBruler et al. | |
| 2014/0061987 A1 | 3/2014 | DeBruler et al. | |
| 2014/0202809 A1 | 7/2014 | Ozaki et al. | |
| 2014/0316652 A1 | 10/2014 | Ericksen et al. | |
| 2015/0183440 A1 | 7/2015 | Jackson | |
| 2015/0317065 A1 | 11/2015 | Meriaz et al. | |
| 2016/0288867 A1 | 10/2016 | Murakami | |
| 2016/0339987 A1 | 11/2016 | Walthert et al. | |
| 2016/0339989 A1 | 11/2016 | Walthert et al. | |
| 2017/0087932 A1 | 3/2017 | Winshtein et al. | |
| 2017/0198779 A1 | 7/2017 | Batsch et al. | |
| 2017/0219041 A1 | 8/2017 | Debruler et al. | |
| 2017/0284493 A1 | 10/2017 | Smith | |
| 2018/0297435 A1 | 10/2018 | Brady et al. | |
| 2018/0304952 A1 | 10/2018 | Krugman et al. | |
| 2019/0031275 A1 | 1/2019 | Weagle | |
| 2019/0031276 A1 | 1/2019 | Weagle | |
| 2019/0031277 A1 | 1/2019 | Weagle | |
| 2019/0039681 A1 | 2/2019 | Weagle | |
| 2019/0047657 A1 | 2/2019 | Weagle | |
| 2019/0047658 A1 | 2/2019 | Weagle | |
| 2019/0061865 A1 | 2/2019 | Weagle | |
| 2019/0061866 A1 | 2/2019 | Weagle | |
| 2019/0061867 A1 | 2/2019 | Weagle | |
| 2019/0061868 A1 | 2/2019 | Weagle | |
| 2019/0168838 A1 | 6/2019 | Weagle | |
| 2020/0079462 A1 | 3/2020 | Weagle | |
| 2020/0079463 A1 | 3/2020 | Weagle | |
| 2020/0094907 A1 | 3/2020 | Weagle | |
| 2020/0094908 A1 | 3/2020 | Weagle | |
| 2020/0094909 A1 | 3/2020 | Weagle | |
| 2020/0094910 A1 | 3/2020 | Weagle | |
| 2020/0094911 A1 | 3/2020 | Weagle | |
| 2020/0094921 A1 | 3/2020 | Mackro | |
| 2020/0108884 A1 | 4/2020 | Przykucki, Jr. et al. | |
| 2020/0115001 A1 | 4/2020 | Weagle | |
| 2020/0115002 A1 | 4/2020 | Weagle | |
| 2020/0324848 A1 | 10/2020 | Weagle | |

FOREIGN PATENT DOCUMENTS

| | | |
|---|---|---|
| CA | 474575 | 6/1951 |
| CA | 474575 A | 6/1951 |
| CH | 63758 A | 2/1914 |
| CN | 2846274 Y | 12/2006 |
| CN | 201198348 | 2/2009 |
| CN | 302966622 S | 10/2014 |
| CN | 303438302 S | 11/2015 |
| CN | 303584666 S | 2/2016 |
| CN | 303604532 S | 3/2016 |
| CN | 304240449 S | 8/2017 |
| CN | 304327156 S | 10/2017 |
| DE | 1084599 B | 6/1960 |
| DE | 1122392 B | 1/1962 |
| DE | 3133576 A1 | 5/1983 |
| DE | 3223728 A1 | 12/1983 |
| DE | 8906328 U1 | 11/1989 |
| DE | 3833880 A1 | 4/1990 |
| DE | 4119339 A1 | 1/1992 |
| DE | 9404873 U1 | 5/1994 |
| DE | 9403640 U1 | 6/1994 |
| DE | 9414705 U1 | 2/1995 |
| DE | 19503047 A1 | 8/1996 |
| DE | 19635939 A1 | 6/1997 |
| DE | 19633692 A1 | 2/1998 |
| DE | 102013004788 | 9/2013 |
| DK | 49600 C | 12/1934 |
| EP | 0032170 B1 | 2/1986 |
| EP | 0030306 B1 | 4/1986 |
| EP | 0125244 B1 | 1/1987 |
| EP | 0399615 A2 | 11/1990 |
| EP | 0336891 | 7/1992 |
| EP | 420610 B1 | 2/1996 |
| EP | 726198 A2 | 8/1996 |
| EP | 0744562 | 11/1996 |
| EP | 0731017 B1 | 10/1997 |
| EP | 0941916 A1 | 9/1999 |
| EP | 0992374 A1 | 4/2000 |
| EP | 1049618 B1 | 9/2003 |
| EP | 728093 B2 | 11/2005 |
| EP | 02000398 A2 | 12/2008 |
| EP | 01884455 B1 | 4/2009 |
| EP | 2096024 A1 | 9/2009 |
| EP | 2100807 A1 | 9/2009 |
| EP | 2357098 A2 | 8/2011 |
| EP | 02001733 B1 | 12/2012 |
| EP | 2483141 B1 | 11/2013 |
| EP | 02913257 A1 | 9/2015 |
| FR | 347724 A | 3/1905 |
| FR | 353990 A | 9/1905 |
| FR | 350269 A | 12/1905 |
| FR | 376759 A | 8/1907 |
| FR | 467213 A | 6/1914 |
| FR | 547006 A | 11/1922 |
| FR | 559088 A | 9/1923 |
| FR | 28240 E | 1/1925 |
| FR | 636211 A | 4/1928 |
| FR | 902973 A | 9/1945 |
| FR | 972653 A | 2/1951 |
| FR | 1030006 A | 6/1953 |
| FR | 1032268 A | 6/1953 |
| FR | 1059922 A | 3/1954 |
| FR | 1064265 A | 5/1954 |
| FR | 1067221 A | 6/1954 |

(56) References Cited

FOREIGN PATENT DOCUMENTS

| | | | |
|---|---|---|---|
| FR | 1082316 | A | 12/1954 |
| FR | 2418742 | A1 | 9/1979 |
| FR | 2494208 | A2 | 5/1982 |
| FR | 2687976 | A1 | 9/1993 |
| FR | 2687976 | B1 | 5/1994 |
| FR | 3004415 | A1 | 10/2014 |
| GB | 166065 | A | 7/1921 |
| GB | 223638 | A | 10/1924 |
| GB | 238069 | A | 8/1925 |
| GB | 239848 | A | 12/1925 |
| GB | 258141 | A | 9/1926 |
| GB | 264003 | A | 1/1927 |
| GB | 279630 | A | 11/1927 |
| GB | 302026 | A | 12/1928 |
| GB | 322370 | A | 12/1929 |
| GB | 469697 | A | 7/1937 |
| GB | 585122 | A | 1/1947 |
| GB | 585904 | A | 2/1947 |
| GB | 586372 | A | 3/1947 |
| GB | 691551 | A | 5/1953 |
| GB | 717259 | A | 10/1954 |
| GB | 720093 | A | 12/1954 |
| GB | 824866 | A | 12/1959 |
| GB | 841523 | A | 7/1960 |
| GB | 1540824 | A | 2/1979 |
| GB | 1545403 | A | 5/1979 |
| GB | 2038736 | A | 7/1980 |
| GB | 2052407 | A | 1/1981 |
| GB | 2073680 | A | 10/1981 |
| GB | 2106843 | A | 4/1983 |
| JP | S60-110588 | | 6/1985 |
| JP | S61-124683 | | 2/1986 |
| JP | S61-160380 | | 7/1986 |
| JP | S62-187608 | | 8/1987 |
| JP | 63-112191 | U | 7/1988 |
| JP | 649887 | U | 1/1989 |
| JP | 1204884 | A | 8/1989 |
| JP | 5069875 | A | 3/1993 |
| JP | 05-020635 | Y2 | 5/1993 |
| JP | 1999091671 | A | 4/1999 |
| JP | 2000159170 | A | 6/2000 |
| JP | 2000159171 | A | 6/2000 |
| JP | 2000159177 | A | 6/2000 |
| JP | 2000159178 | A | 6/2000 |
| JP | 2000168666 | A | 6/2000 |
| KR | 10-2009-0117921 | | 11/2009 |
| TW | 416920 | B | 1/2001 |
| TW | 568054 | U | 12/2003 |
| TW | 596028 | | 6/2004 |
| TW | D111693 | | 7/2006 |
| TW | M335458 | U | 7/2008 |
| TW | M354565 | U | 4/2009 |
| TW | D140125 | | 4/2011 |
| TW | D149623 | | 10/2012 |
| WO | WO-82/00445 | A1 | 2/1982 |
| WO | WO-84/00526 | A1 | 2/1984 |
| WO | WO-87/01670 | A1 | 3/1987 |
| WO | WO-95/23728 | A1 | 9/1995 |
| WO | WO-97/46443 | A1 | 12/1997 |
| WO | WO-9910224 | A1 * | 3/1999 ............ B62K 25/30 |
| WO | WO-00/013961 | A1 | 3/2000 |
| WO | WO 2002/038437 | | 5/2002 |
| WO | WO 2019/046039 | | 3/2019 |
| WO | WO 2019/046040 | | 3/2019 |

OTHER PUBLICATIONS

Copending U.S. Appl. No. 16/141,277, filed Sep. 25, 2018.
Copending U.S. Appl. No. 16/141,323, filed Sep. 25, 2018.
Copending U.S. Appl. No. 16/141,887, filed Sep. 25, 2018.
Copending U.S. Appl. No. 16/141,916, filed Sep. 25, 2018.
Copending U.S. Appl. No. 16/159,069, filed Oct. 12, 2018.
Copending U.S. Appl. No. 16/159,104, filed Oct. 12, 2018.
Copending U.S. Appl. No. 16/159,169, filed Oct. 12, 2018.
Copending U.S. Appl. No. 16/159,252, filed Oct. 12, 2018.
Copending U.S. Appl. No. 16/161,804, filed Oct. 16, 2018.
Color photograph of Armstrong motor cycle, Applicant Admitted Prior Art, Applicant's internal files.
Color photograph of Armstrong bicycle, Applicant Admitted Prior Art, Applicant's Internal Files.
Black and white photograph of Scorpion motorcycle, Applicant Admitted Prior Art, Applicant's internal files.
Black and white photograph of Silencer motorcycle, Applicant Admitted Prior Art, Applicant's internal files.
Color Photograph of a Cotton TC-70 motorcycle, Applicant Admitted Prior Art, Applicant's internal files.
Black and white photograph of Greeves trials machine, Applicant Admitted Prior Art, Applicant's internal files.
Anubi et al., "Variable stiffness suspension system", Mechanical Sciences, vol. 4:139-151 (2013), www.mech-sci-net/4/139/2013.

* cited by examiner

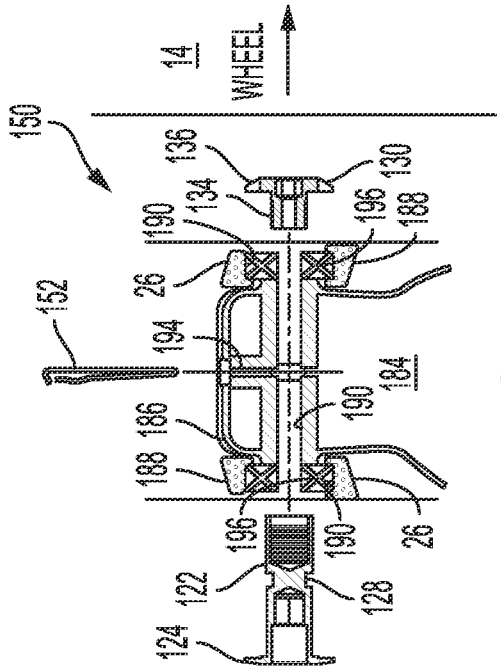
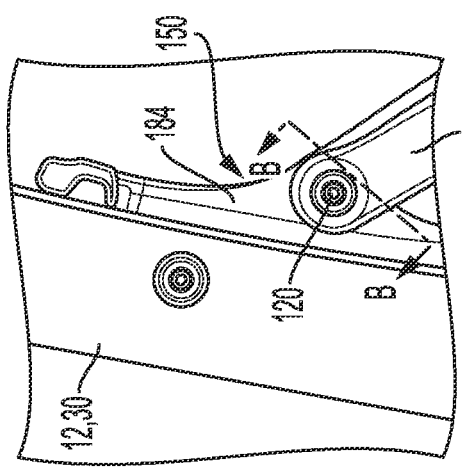
FIG. 11
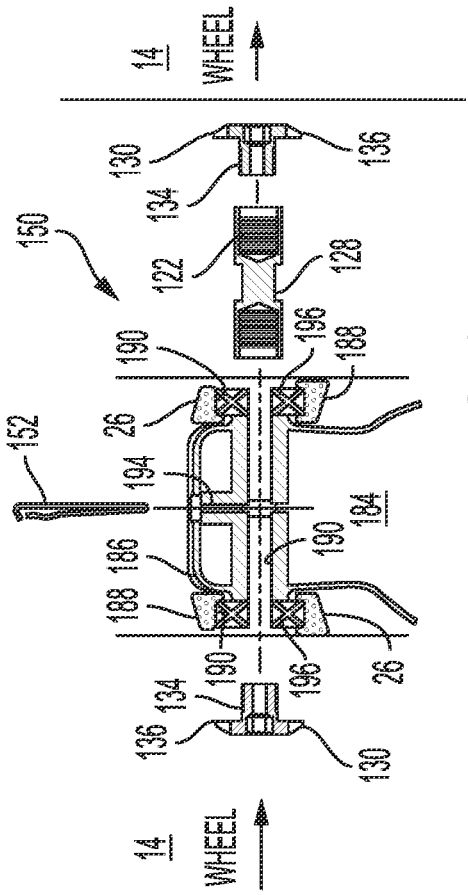
FIG. 12
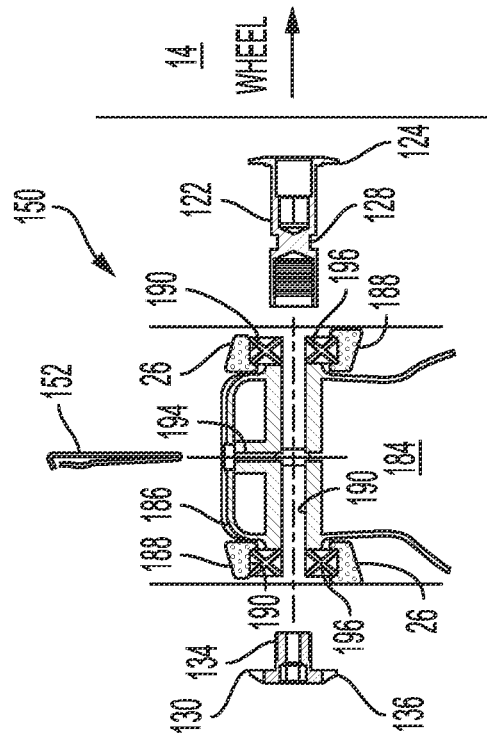
FIG. 13
FIG. 14

SUSPENSION PIVOT ASSEMBLIES HAVING A RETENTION FEATURE

FIELD OF THE DISCLOSURE

The disclosure is generally directed to wheel suspension assemblies for cycles and, more specifically, to wheel suspension assemblies for cycles that include pivot assemblies.

BACKGROUND

Suspensions can be key components of wheeled vehicles, including cycles. Suspensions allow a wheel to move in a compliant manner in response to ground conditions as a rider pilots a cycle, with an aim to improve handling and control during riding. In many cases, suspensions can include links and pivot assemblies, which together can compose an articulating mechanism which allows a wheel to move in a compliant manner. The pivot assemblies allow the links to articulate in one or more degrees of freedom.

Recently, telescopic front suspension forks have been popular suspension systems for two-wheeled vehicles. A telescopic front suspension fork includes sliding stantions connected in a steerable manner to a cycle frame and a telescoping mechanism for wheel displacement. Few, if any, telescopic forks include pivot assemblies.

Linkage front suspensions, which include links and pivot assemblies, have been provided as an alternative to telescopic forks, but have failed to achieve market dominance due to a variety of reasons. In contrast, linkage rear suspensions account for almost all the rear suspensions available for two wheeled suspension structures sold today, and almost no examples of solely telescopic or sliding rear suspension structures can be found in today's marketplace.

Suspension linkage assemblies having one or more pivots located next to a wheel opening or other rotating components are commonly avoided due to a potentially unsafe condition in locating a pivot next to a wheel opening. If a pivot were to loosen and unintentionally auto-disassemble in an axial direction during use, then the pivot axle could possibly contact a wheel opening or other rotating component, causing the wheel rotation to stop without warning.

Notwithstanding the above, there are particular benefits to using suspension linkage assemblies on front suspensions. Suspension linkage assemblies including links and pivot assemblies can be economically manufactured and typically feature very low friction, remaining compliant to even the slightest change in ground conditions. Suspension linkage assemblies are also relatively easy to seal from the elements, which helps to maintain performance without significant upkeep.

Telescopic forks, on the other hand, use sliding stantions, which require very expensive and tight manufacturing tolerances. Outer surfaces of the stantion typically slide against bushings to allow for compliance. Front suspension for a cycle is subject to large bending forces fore and aft and, to a lesser degree, lateral forces. Because telescopic forks have relatively large stantions, and correspondingly large siding surfaces and seals, large breakaway friction in the system (known as "stiction") is generated by these components. Stiction resists compression of the suspension in reaction to bumps, which is a shortcoming in a suspension product where the goal is to react to road or terrain conditions, e.g., by deflecting in response to ground conditions and/or absorbing impact from bumps. Additionally, as the telescopic fork is loaded in the fore and aft direction (which can occur on impact or braking), the bushings can bind, resulting in even greater stiction at the exact moment when a rider needs the most compliance. Telescopic forks and their large sliding bushings also can require significant maintenance and upkeep to keep performance from diminishing quickly.

In any front suspension, it is of the utmost importance to keep the front wheel connected to the frame and able to rotate freely. When an operator is piloting a cycle, a front wheel unintentionally or abruptly disassembling from the frame or ceasing rotation could pose a significant safety risk.

SUMMARY

The present disclosure presents a solution to the problem of pivot axles unintentionally or abruptly disassembling, allowing the safe and secure use of pivot axles next to wheel openings on cycle linkage front and rear suspensions.

In accordance with a first aspect, a pivot assembly for a cycle linkage suspension is described herein that includes first and second members having lateral openings extending therethrough. The pivot assembly further includes a pivot. The pivot includes a rod portion that is configured to be disposed within the lateral openings of the first and second members to pivotably couple the first and second members together. The rod portion includes an opening extending through an intermediate portion thereof. The pivot assembly further includes a pin that is configured to be removably inserted at least partially into the opening in the rod portion to thereby restrict lateral movement of the rod portion within the first and second members.

According to some forms, the pivot assembly can include one or more of the following aspects: the opening can be an annular recess extending around the rod portion; the first member can be a link and the second member can be a frame member; the first and second members can be links; the first member can include an inner pivot portion and the second member can include outer pivot portions that are configured to receive the inner pivot portion of the first member therebetween; one of the first and second members can include a pin bore that extends through a portion thereof that is sized to receive the pin therein, where the pin bore aligns with the opening in the rod portion with the pivot rod disposed within the lateral openings of the first and second members, and the pin bore can optionally extend entirely through the one of the first and second members such that a distal end of the pin projects through a distal opening of the pin bore; the pivot can further include an annular flange that is integral with the rod portion at one end thereof and a bolt that has an annular cap and a shaft that is configured to secure to the other end thereof, where the pivot is configured to clamp portions of the first and second members between the annular flange and annular cap; the pivot can further include bolts that have annular caps and shafts configured to secure to both ends of the rod portion, where the pivot is configured to clamp portions of the first and second members between the annular caps; the pivot can include a tool interface; the pin can include one or more of: a deflectable portion; a bendable portion, a scalloped portion; a threaded portion; or a bent portion; the pivot assembly can include a wheel carrier coupled to one of the first or second members; the pivot assembly can include a fork and the first and second members can be links in a front linkage suspension that is pivotably coupled to the fork, and further one of the first and second members can include a front wheel carrier such that the front linkage suspension is configured to operably couple a front wheel to the fork; or the pivot assembly can include a frame and the first and second members can be links in a rear linkage suspension pivotably coupled to the frame, and further one of the first and second members can include a rear wheel carrier such that the rear linkage suspension is configured to operably couple a rear wheel to the frame.

In accordance with a second aspect, a front linkage suspension for a cycle is described that includes a fork, a plurality of links, and pivot assemblies rotatably coupling the plurality of links together and to the fork at pivot couplings. The pivot assemblies include a pivot that includes a rod portion, an opening in the rod portion that extends through an intermediate portion thereof, and a pin that is configured to be removably inserted at least partially into the opening in the rod portion to thereby restrict lateral movement of the rod portion with the rod portion disposed within the pivot coupling. The front linkage suspension can further include a suspension device operably coupled to the fork and one of the plurality of links.

According to some versions, the plurality of links can include first, second, and third links, where the first and third links are pivotably coupled to the fork and the second link is pivotably coupled between the first and third links and/or one of the plurality of links or the fork at each of the pivot couplings can include a pin bore that extends through a portion thereof that is sized to receive the pin therein, where the pin bore aligns with the opening in the pivot rod with the rod portion disposed within the pivot coupling.

In accordance with a third aspect, a rear linkage suspension for a cycle is described that includes a cycle frame, a plurality of links, and pivot assemblies that rotatably couple ends of the plurality of links together and to the cycle frame at pivot couplings. The pivot assemblies include a pivot that includes a rod portion, an opening in the rod portion extends through an intermediate portion thereof, and a pin is configured to be removably inserted at least partially into the opening in the rod portion to thereby restrict lateral movement of the rod portion with the rod portion disposed within the pivot coupling. Further, one of the plurality of links can include a suspension device.

In accordance with a fourth aspect, a pivot assembly for cycle suspension is described that includes a pivot member including a laterally extending bore and a pin bore intersecting the laterally extending bore and a pivot including a rod portion with an opening extending through a portion thereof. The rod portion is configured to be received within the laterally extending bore to align the opening with the pin bore.

According to some forms, the pivot assembly can include one or more of the following aspects: the pivot assembly can further include a pin that is received with the pin bore and extends at least partially through the opening to thereby restrict lateral movement of the rod portion within the laterally extending bore; the pin can include one or more of: a deflectable portion; a bendable portion, a scalloped portion; a threaded portion; or a bent portion; the pin bore can extend entirely through the pivot member such that a distal end of the pin projects through a distal opening of the pin bore; the opening can be an annular recess that extends around an intermediate portion of the rod portion; the pivot can further include an annular flange that is integral with the rod portion at one end thereof and a bolt that has an annular cap and a shaft that is configured to secure to the other end thereof; or the pivot can further include bolts that have annular caps and shafts that are configured to secure to both ends of the rod portion.

BRIEF DESCRIPTION OF THE DRAWINGS

The above needs are at least partially met through provision of the embodiments described in the following detailed description, particularly when studied in conjunction with the drawings, wherein:

FIG. 11 is a sectional side view of a first example suspension pivot assembly constructed according to the teachings of the disclosure.

FIG. 12 is a combined cross-sectional view of the pivot assembly of FIG. 11 taken along the line B-B and the pivot rod assembly of FIG. 6 taken along the line A-A in FIGS. 7 and 8 showing a wheel on one side thereof.

FIG. 13 is a combined cross-sectional view of the pivot assembly of FIG. 11 taken along the line B-B and the pivot rod assembly of FIG. 6 taken along the line A-A in FIGS. 7 and 8 showing a wheel on an opposite side thereof.

FIG. 14 is a combined cross-sectional view of the pivot assembly of FIG. 11 taken along the line B-B and a second example pivot rod assembly taken along a generally centrally disposed line.

DETAILED DESCRIPTION

The present disclosure is not to be limited in scope by the specific embodiments described below, which are intended as exemplary illustrations of individual aspects of the various embodiments described herein. Functionally equivalent methods and components fall within the scope of the disclosure. Indeed, various modifications, in addition to those shown and described herein, will become apparent to those skilled in the art from the description. Such modifications are intended to fall within the scope of the appended claims. Throughout this application, the singular includes the plural and the plural includes the singular, unless indicated otherwise. The words "formed, provided, disposed, and located" are used to denote relative positioning in the instant description. All cited publications, patents, and patent applications are herein incorporated by reference in their entirety.

Figure 1:
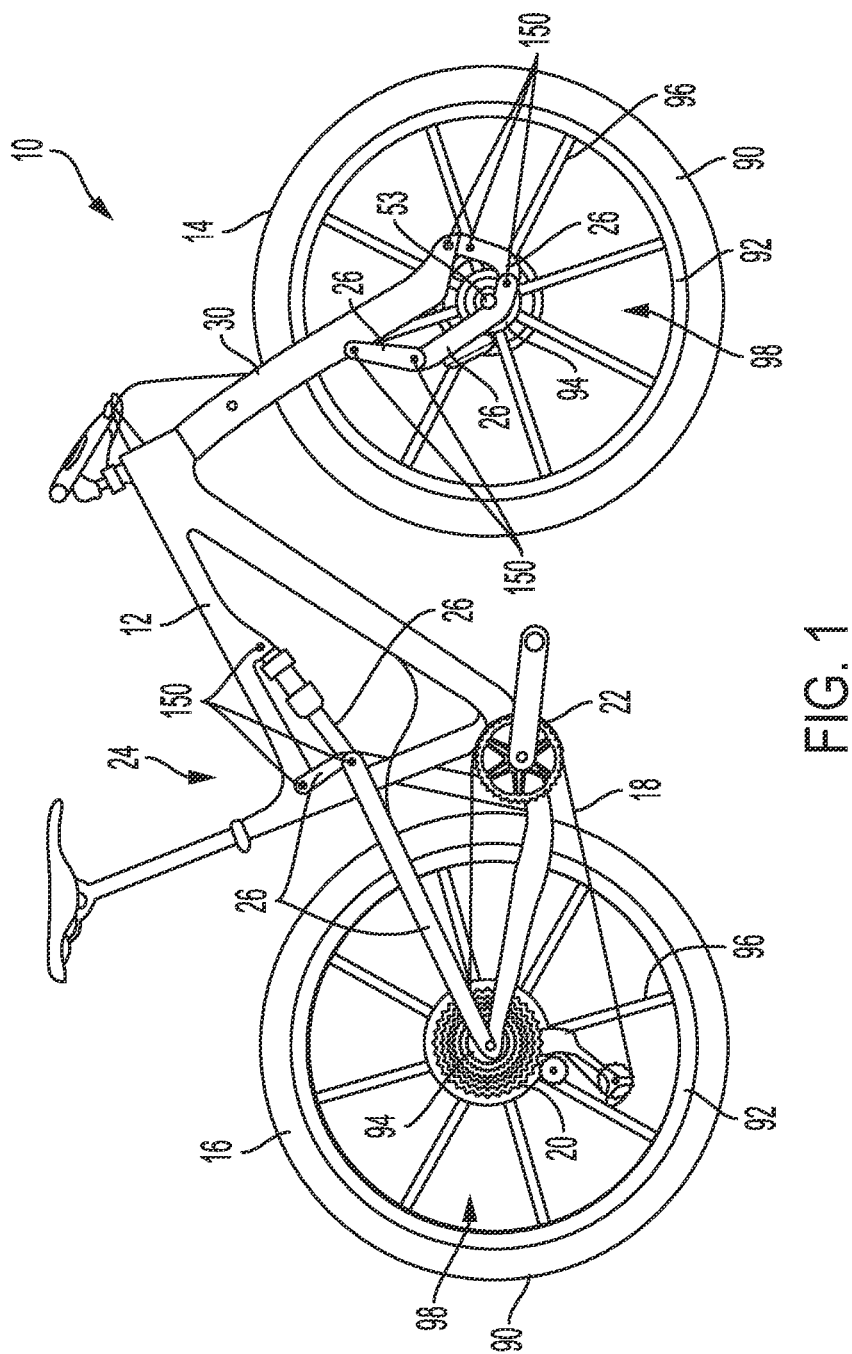
FIG. 1 is a side view of a cycle including a front wheel suspension assembly and a rear wheel suspension assembly constructed according to the teachings of the disclosure.

Turning now to FIG. 1, a cycle 10 includes a frame 12, a front wheel 14 rotatably connected to a fork 30, which can be bifurcated or single sided, and a rear wheel 16 rotatably connected to the frame 12. The rear wheel 16 is drivable by a drive mechanism, such as a chain 18 connected to a wheel sprocket 20 and to a chain ring 22, so that driving force may be imparted to the rear wheel 16. The fork 30 allows the front wheel 14 to deflect in response to ground conditions as a rider rides the cycle and to improve handling and control during riding. To improve handling characteristics, the fork 30 and the front wheel 14 may be operatively connected to a front suspension assembly or linkage 46 via a wheel carrier 53. The frame 12 may optionally include a rear wheel suspension assembly 24, which may allow the rear wheel 16 to deflect in response to ground conditions as a rider rides the cycle 10 and to improve handling and control during riding. One or more links 26 of the front and rear suspension assemblies 46, 24 can be pivotably coupled together via pivot assemblies 120. The pivot assemblies 120 can be utilized to pivotably connect links 26 together, a link 26 to the frame 12, a link 26 to the fork 30, or other members of the cycle 10. The frame 12 or fork 30 can be a link in a multi-member chain, acting as a fixed location for links 26 to pivotably connect to, allowing articulation of the various links 26 in the suspension assembly 46, 24. As the links 26 articulate, the wheels 14, 16 are able to move relative to the frame 12 and/or fork 30, allowing the wheels 14, 16 to move in a compliant manner in response to ground conditions as a rider pilots the cycle 10, improving handling and control during riding.

As shown in FIG. 1, the front and rear wheels 14, 16 are configured to have a tire 90 mounted thereon. Each of the front and rear wheels 14, 16 include a rim 92, a hub 94, and a spoke 96. The wheel 14, 16 can be rotatably mounted to a link 26 or frame member 12, 30 of the cycle 10 via the hub 94. A wheel opening 98 is demarcated by the boundaries of any combination of the spokes 96, the hub 94, and the rim 92. The spokes 96, the hub 94, and the rim 92 can be separate subcomponents assembling to fashion the wheel 14, 16. Further, the spokes 96, the hub 94, and the rim 92 can be combined in various ways such that any of the various wheel subcomponents including the spokes 96, the hub 94, and the rim 92 can each include one or more parts. Wheels 50 can comprise one or more components manufactured from plastics, cast metals, and fibrous composites. The rim 92, hub 94, and spokes 96 can be combined into one molded or bonded assembly, such that the components are part of a unitized assembly. In some embodiments, the tire 90 is manufactured using a compliant material such as rubber or synthetic rubber and can be assembled onto the rim 92 such that it can provide a compliant intermediary volume between the rim 92 and the ground. The spokes 96 can be manufactured from a variety of materials, including plastics, fibrous composites, tensioned fabrics or fibers, metals including steel, magnesium, and aluminum among others.

Figure 2:
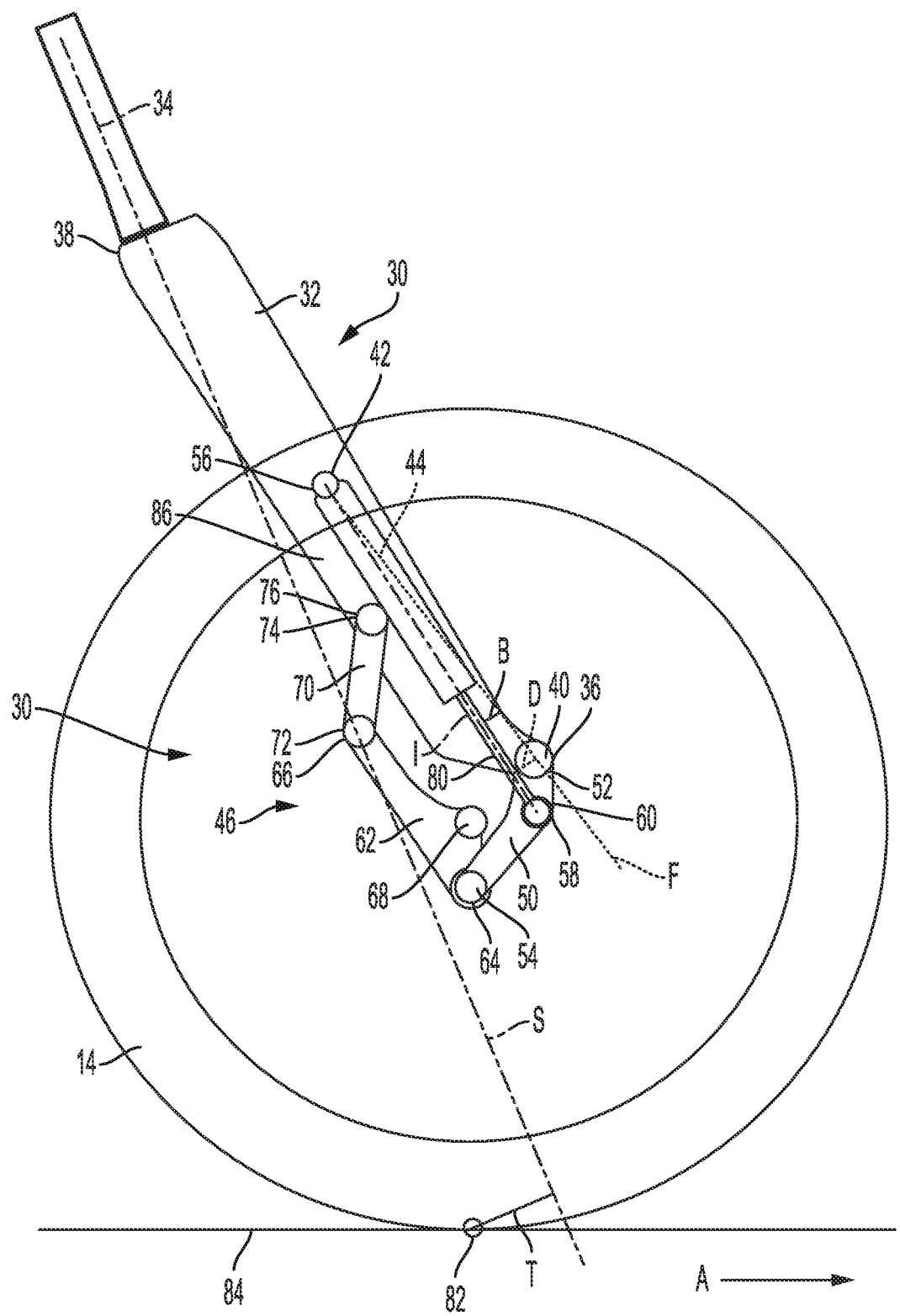
FIG. 2 is a close up side view of the front wheel suspension assembly of FIG. 1.
Figure 3:
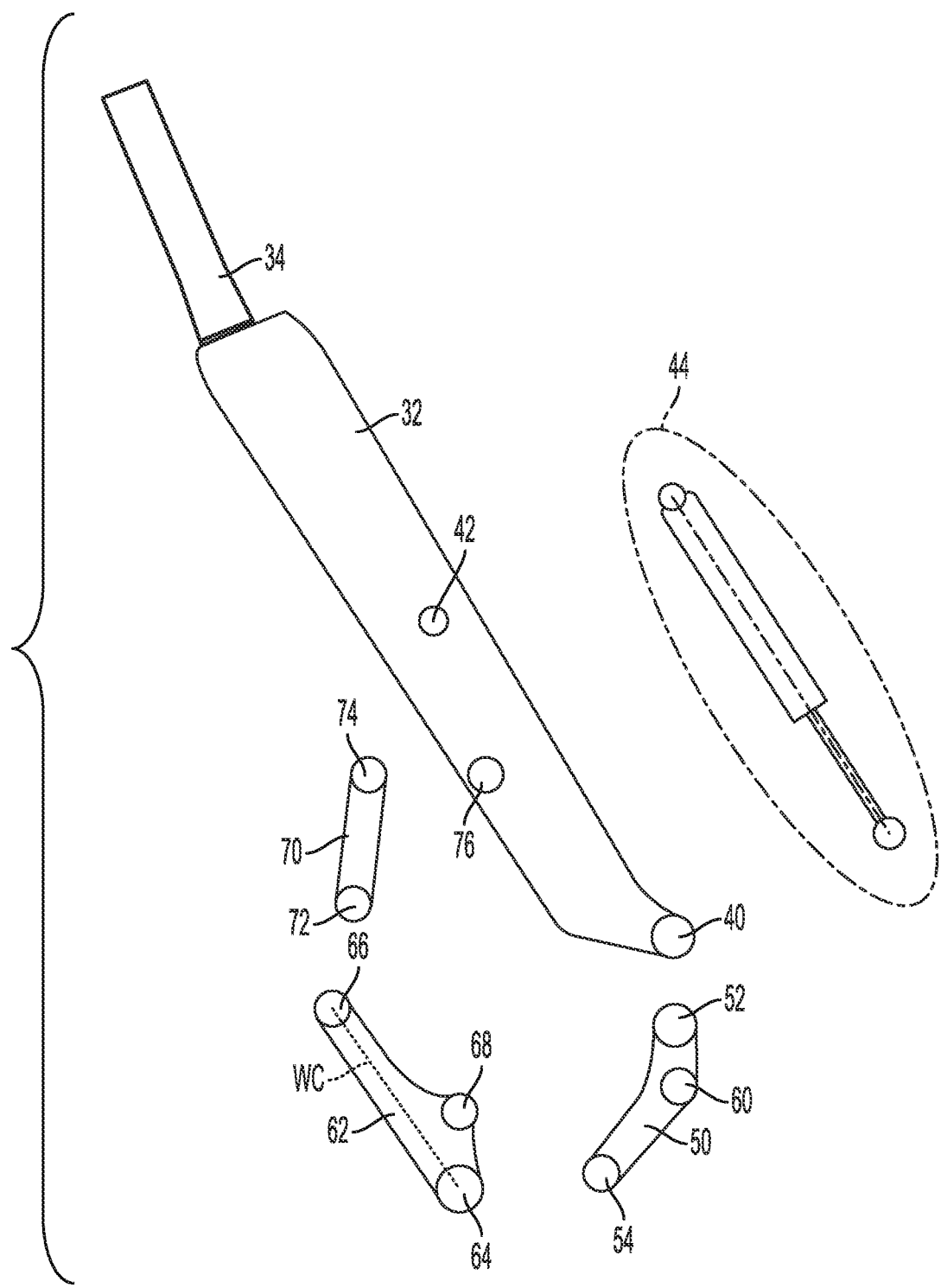
FIG. 3 is a side exploded view of the front wheel suspension assembly of FIG. 2.
Figure 4:
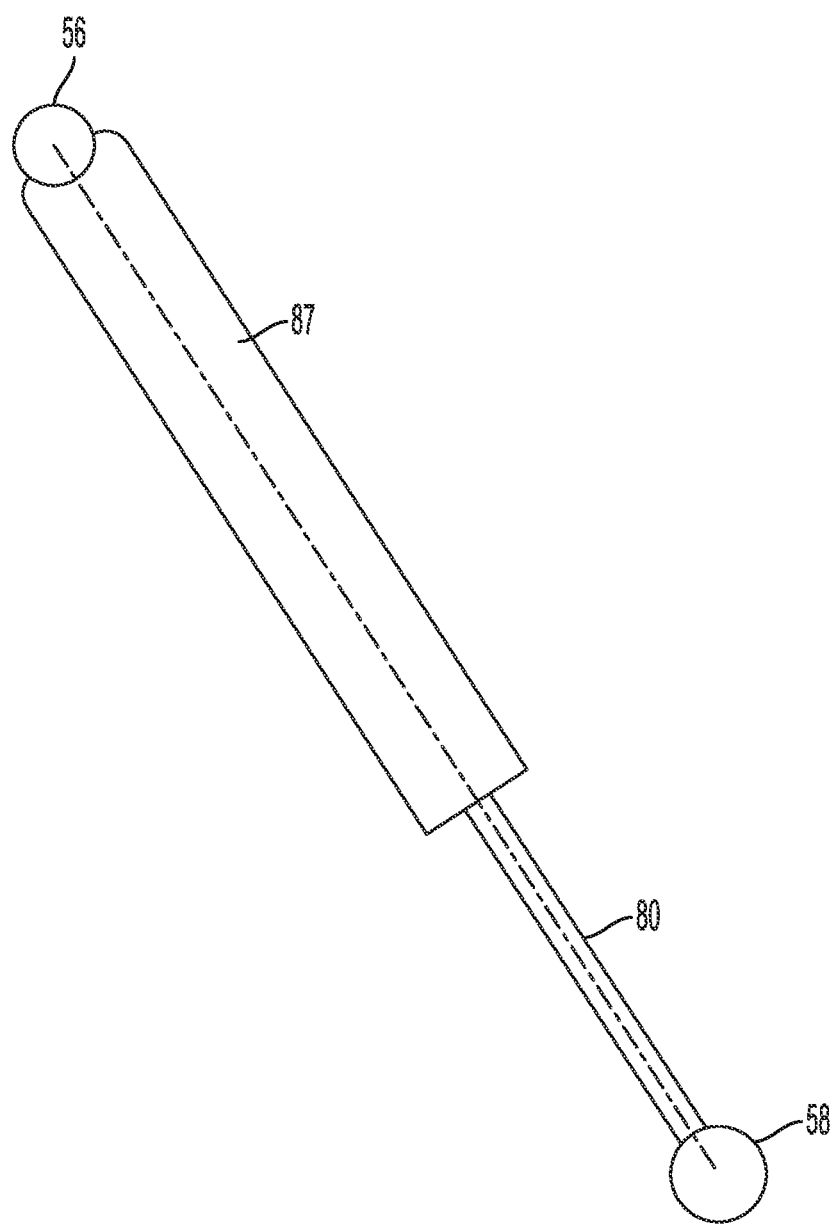
FIG. 4 is a side cut-away view of a shock absorber of the wheel suspension assembly of FIG. 2.

As illustrated in FIGS. 2-4, the fork 30 includes a first arm 32 operatively connected to a steering shaft 34. The steering shaft 34 includes a steering axis S that is formed by a central axis of the steering shaft 34. The first arm 32 has a first end 36 and a second end 38, the first arm 32 including a first arm fixed pivot 40 and a first arm shock pivot 42. The first arm shock pivot 42 operably connects a suspension device, such as a shock absorber 44 to the first arm 32. For example, the first arm shock pivot 42 allows relative motion, in this case rotation, between the shock absorber 44 and the first arm 32. In other embodiments, other types of relative motion, such as flexure or translation, between the shock absorber 44 and the first arm 32 may be employed. The first arm fixed pivot 40 pivotably connects one element of the linkage 46, as discussed further below, to the first arm 32.

A shock link 50 is pivotably connected to the first arm fixed pivot 40. The shock link 50 includes a shock link fixed pivot 52 and a shock link floating pivot 54 spaced apart from one another along a length of the shock link 50. The shock link 50 is pivotably connected to the first arm fixed pivot 40 at the shock link fixed pivot 52 such that the shock link 50 is rotatable about the shock link fixed pivot 52 and the shock link fixed pivot 52 remains in a fixed location relative to the first arm 32, while the shock link floating pivot 54 is movable relative to the first arm 32.

A pivot, as used herein, includes any connection structure that may be used to operatively connect one element to another element, and that allows relative movement between the connected elements. An operative connection may allow for one component to move in relation to another while constraining movement in one or more degrees of freedom. For example, the one degree of freedom may be pivoting about an axis. In one embodiment, a pivot may be formed from a journal or through hole in one component and an axle in another component. In other examples, pivots may include ball and socket joints. Yet other examples of pivots include, but are not limited to singular embodiments and combinations of, compliant mounts, sandwich style mounts, post mounts, bushings, bearings, ball bearings, plain bearings, flexible couplings, flexure pivots, journals, holes, pins, bolts, and other fasteners. Also, as used herein, a fixed pivot is defined as a pivotable structure that does not change position relative to the first arm 32. As used herein, a floating pivot is defined as a pivot that is movable (or changes position) relative to another element, for example movable relative to first arm 32.

The suspension assembly or linkage 46 is configured in a trailing orientation. A trailing orientation is defined herein as a linkage that includes a fixed pivot that is forward of the corresponding floating pivot when the cycle is traveling in the forward direction of travel as represented by arrow A in FIGS. 1A and 1B. In other words, the floating pivot trails the fixed pivot when the cycle is traveling in the forward direction of travel. For example, in the illustrated embodiment, the shock link fixed pivot 52 is forward of the shock link floating pivot 54. The disclosed suspension assembly or linkage 46 is also characterized as a multi-bar linkage. A multi-bar linkage is defined herein as a linkage in which any part of the front wheel 14 is directly connected to a link that is not directly connected to the fork 30. In other embodiments, the suspension assembly or linkage may be configured in a leading orientation, which includes a fixed pivot that is rearward of the corresponding floating pivot when the cycle is traveling in the forward direction.

The disclosed suspension assembly or linkage 46 is also characterized as a multi-bar linkage. A multi-bar linkage is defined herein as a linkage in which any part of the front wheel 14 is directly connected a link that is not directly connected to the fork 30. In the illustrated embodiment of FIG. 1, the front wheel is directly connected to a wheel carrier 53, which is not directly connected to the fork 30.

The shock absorber 44 includes a first shock mount 56 and a second shock mount 58, the first shock mount 56 being pivotably connected to the first arm shock pivot 42, the second shock mount 58 being pivotably connected to a shock connection pivot 60 located between the shock link fixed pivot 52 and the shock link floating pivot 54 along a length of the shock link 50.

A wheel carrier 62 includes a wheel carrier first pivot 64 and a wheel carrier second pivot 66 spaced apart from one another along a length of the wheel carrier 62. Both the wheel carrier first pivot 64 and the wheel carrier second pivot 66 are floating pivots, as they both move translationally relative to the first arm 32. A wheel mount 68 is adapted to be connected to a center of a wheel, for example the front wheel 14. In the disclosed embodiment, a center of the front wheel 14 is rotatably connected to the wheel mount 68. The wheel carrier first pivot 64 is pivotably connected to the shock link floating pivot 54 so that the wheel carrier second pivot 66 is pivotable about the wheel carrier first pivot 64 relative to the shock link floating pivot 54.

A control link 70 includes a control link floating pivot 72 and a control link fixed pivot 74. The control link floating pivot 72 is pivotably connected to the wheel carrier second pivot 66, and the control link fixed pivot 74 is pivotably connected to a first arm control pivot 76 located on the first arm 32 such that the control link floating pivot 72 is pivotable about the control link fixed pivot 74, which remains in a fixed location relative to the first arm control pivot 76.

In some embodiments, the shock connection pivot 60 is closer to the shock link fixed pivot 52 than to the shock link floating pivot 54, as illustrated in FIGS. 2 and 3. As a function of suspension compression and link movement, a perpendicular distance D between a central axis I of an inshaft 80 of the shock absorber 44 and a center of the shock link fixed pivot 52 varies as the shock absorber 44 is compressed and extended, as the shock absorber pivots about the first shock mount 56. This pivoting and varying of the perpendicular distance D allows the leverage ratio and motion ratio to vary as the shock absorber 44 compresses and extends. As a function of suspension compression and link movement, a mechanical trail distance T varies as the shock absorber 44 compresses and extends. The mechanical trail distance T is defined as the perpendicular distance between the steering axis S and the contact point 82 of the front wheel 14 with the ground 84. More specifically, as the suspension compresses, beginning at a state of full extension, the mechanical trail distance T increases, thus increasing stability during compression. Compression is usually experienced during braking, cornering, and shock absorbing, all of which benefit from increased stability that results from the mechanical trail distance increase.

Mechanical trail (or "trail", or "caster") is an important metric relating to handling characteristics of two-wheeled cycles. Mechanical trail is an arrangement in which the wheel is rotatably attached to a fork, which has a steering axis that is offset from the contact point of the wheel with the ground. When the steering axis is forward of the contact point, as in the case of a shopping cart, this configuration allows the caster wheel to follow the direction of cart travel. If the contact point moves forward of the steering axis (for example when reversing direction of a shopping cart), the directional control becomes unstable and the wheel spins around to the original position in which the contact point trails the steering axis. The friction between the ground and the wheel causes a self-righting torque that tends to force the wheel to trail the steering axis. The greater the distance between the contact point and perpendicular to the steering axis, the more torque is generated, and the greater the stability of the system. Similarly, the longer the perpendicular distance between the cycle wheel contact point and the steering axis, the more torque is generated, and the greater the stability of the system. Conversely, the shorter the perpendicular distance between the cycle wheel contact point and the steering axis, the less torque is generated, and the lower the stability of the system.

This caster effect is an important design characteristic in cycles. Generally, the caster effect describes the cycle rider's perception of stability resulting from the mechanical trail distance described above. If the wheel gets out of line, a self-aligning torque automatically causes the wheel to follow the steering axis again due to the orientation of the wheel ground contact point being behind the steering axis of the fork. As the contact point of the wheel with the ground is moved further behind the steering axis, self-aligning torque increases. This increase in stability is referred to herein as the caster effect.

In the disclosed wheel suspension assembly, when the suspension is at a state of full extension, the steering axis of the fork 30 projects ahead of the contact point 82. As the suspension assembly moves towards a state of full compression through states of partial compression, the steering axis S projects farther ahead of the contact point 82, which results in the stability increasing. This increased stability stands in contrast to known telescopic fork cycles, which experience reduced trail and thus reduced stability during compression.

Leverage ratios or motion ratios are important metrics relating to performance characteristics of some suspensions. In certain embodiments, a shock absorber can be compressed at a constant or variable rate as the suspension moves at a constant rate towards a state of full compression. As a wheel is compressed, incremental suspension compression distance measurements are taken. Incremental suspension compression distance is measured from the center of the wheel at the wheel rotation axis and parallel with the steering axis, starting from a state of full suspension extension, and moving towards a state of full suspension compression. These incremental measurements are called the incremental suspension compression distance. A shock absorber length can be changed by link movements as the suspension compresses. At each incremental suspension compression distance measurement, a shock absorber length measurement is taken. The relationship between incremental suspension compression distance change and shock absorber length change for correlating measurements of the suspension's compression is called leverage ratio or motion ratio. Leverage ratio and motion ratio are effectively equivalent but mathematically different methods of quantifying the effects of suspension compression distance versus shock compression distance. Overall leverage ratio is the average leverage ratio across the entire range of compression. Overall leverage ratio can be calculated by dividing the total suspension compression distance by the total shock absorber compression distance. Overall motion ratio is the average motion ratio across the entire range of compression. Overall motion ratio can be calculated by dividing the total shock absorber compression distance by the total suspension compression distance.

Generally, a suspended wheel has a compressible wheel suspension travel distance that features a beginning travel state where the suspension is completely uncompressed and no further suspension extension can take place, and an end travel state where a suspension is completely compressed and no further suspension compression can take place. At the beginning of the wheel suspension travel distance, when the suspension is in a completely uncompressed state, the shock absorber is in a state of least compression, and the suspension is easily compressed. As the suspended wheel moves compressively, force at the wheel changes in relation to shock absorber force multiplied by a leverage ratio. A leverage ratio is defined as the ratio of compressive wheel travel change divided by shock absorber measured length change over an identical and correlating given wheel travel distance. A motion ratio is defined as the ratio of shock absorber measured length change divided by compressive wheel travel change over an identical and correlating given wheel travel distance.

In known telescopic forks no leverage ratio exists and, the leverage ratio is always equivalent to 1:1 due to the direct coupling of the wheel to the shock absorber.

A leverage ratio curve is a graphed quantifiable representation of leverage ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression at a constant rate, measurements of shock absorber length are taken as the shortest distance between a first shock pivot and a second shock pivot at equal increments of suspension compression. When graphed as a curve on a Cartesian graph, leverage ratio is shown on the Y axis escalating from the x axis in a positive direction, and vertical wheel travel is shown on the X axis escalating from the Y axis in a positive direction.

A motion ratio curve is a graphed quantifiable representation of motion ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression, measurements of shock absorber length are taken as the shortest distance between a first shock pivot and a second shock pivot at equal increments of suspension compression. When graphed as a curve on a Cartesian graph, motion ratio is shown on the Y axis escalating from the x axis in a positive direction, and vertical wheel travel is shown on the X axis escalating from the Y axis in a positive direction.

In certain embodiments, a leverage ratio or motion ratio curve can be broken down into three equal parts in relation to wheel compression distance or vertical wheel travel, a beginning ⅓ (third), a middle ⅓, and an end ⅓. In certain embodiments, a beginning ⅓ can comprise a positive slope, zero slope, and or a negative slope. In certain embodiments, a middle ⅓ can comprise a positive slope, zero slope, and or a negative slope. In certain embodiments, an end ⅓ can comprise a positive slope, zero slope, and or a negative slope. Certain preferred leverage ratio embodiments can comprise a beginning ⅓ with a positive slope, a middle ⅓ with a less positive slope, and an end ⅓ with a more positive slope. Certain preferred leverage ratio embodiments can comprise a beginning ⅓ with a negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a more negative slope. Certain preferred motion ratio embodiments can comprise a beginning ⅓ with a negative slope, a middle ⅓ with a less negative slope, and an end ⅓ with a more negative slope. Certain preferred motion ratio embodiments can comprise a beginning ⅓ with a positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a more positive slope.

In contrast to telescopic suspensions, the disclosed wheel suspension assembly provides a greater than 1:1 overall leverage ratio between the shock absorber 44 and the shock link 50, due to the indirect coupling (through the linkage 46) of the wheel 14 and the shock absorber 44. In contrast to telescopic suspensions, the disclosed wheel suspension assembly provides a less than 1:1 overall motion ratio between the shock absorber 44 and the shock link 50, due to the indirect coupling (through the linkage 46) of the wheel 14 and the shock absorber 44. Additionally, because of the movement arcs of the various linkage elements, at any given point during compression, instantaneous leverage ratio and motion ratio can vary non-linearly.

The central axis I of the inshaft 80 of the shock absorber 44 is arranged to form an angle B of between 0° and 20° relative to a central axis F of the first arm 32, the central axis F of the first arm 32 being defined by a line formed between a center of the first arm shock pivot 42 and a center of the first arm fixed pivot 40. In other embodiments, the central axis I of the inshaft 80 of the shock absorber 44 forms an angle with the central axis F of the first arm 32 of between 0° and 15°. In other embodiments, the central axis I of the inshaft 80 of the shock absorber 44 forms an angle with the central axis F of the first arm 32 of between 0° and 30°. The angle B may vary within these ranges during compression and extension.

In some embodiments, the first arm 32 includes a hollow portion 86 and the shock absorber 44 is located at least partially within the hollow portion 86 of the first arm 32.

The shock link fixed pivot 52 is offset forward of the central axis I of the inshaft 80 of the shock absorber 44. The central axis I of the inshaft 80 of the shock absorber 44 is positioned between the shock link fixed pivot 52 and the shock link floating pivot 54 in a plane defined by the central axis I of the inshaft 80, the shock link fixed pivot 52 and the shock link floating pivot 54 (i.e., the plane defined by the view of FIG. 2).

A line between a center of the wheel carrier first pivot 64 and a center of the wheel carrier second pivot 66 defines a wheel carrier axis WC, and the wheel mount 68 may be offset from the wheel carrier axis WC in a plane defined by the wheel carrier axis WC and the wheel mount 68 (i.e., the plane defined by the view of FIG. 3). In some embodiments, the wheel mount 68 is offset from the wheel carrier axis WC towards the first arm 32, for example the embodiment illustrated in FIGS. 2 and 3. In other embodiments, the wheel mount 68 may be offset from the wheel carrier axis WC away from the first arm 32.

In the embodiment of FIGS. 2 and 3, the wheel mount 68 is located aft of the shock link fixed pivot 52, such that the central axis I of the inshaft 80 of the shock absorber 44 is located between the wheel mount 68 and the shock link fixed pivot 52 in a plane defined by the central axis I of the inshaft 80 of the shock absorber 44, the wheel mount 68 and the shock link fixed pivot 52 (i.e., the plane defined by the view of FIG. 2).

Turning now to FIG. 4, in some embodiments, the shock absorber 44 includes a shock body 87, in some embodiments comprising a spring and damper. The shock absorber may further include the inshaft 80 that extends from the shock body 87. The second shock mount 58 is formed at one end of the inshaft 80, and the inshaft 80 is pivotably connected to the shock connection pivot 60 by the second shock mount 58 such that the inshaft 80 is compressible and extendable relative to the shock body 87 as the shock link 50 pivots about the shock link fixed pivot 52.

Figure 5:
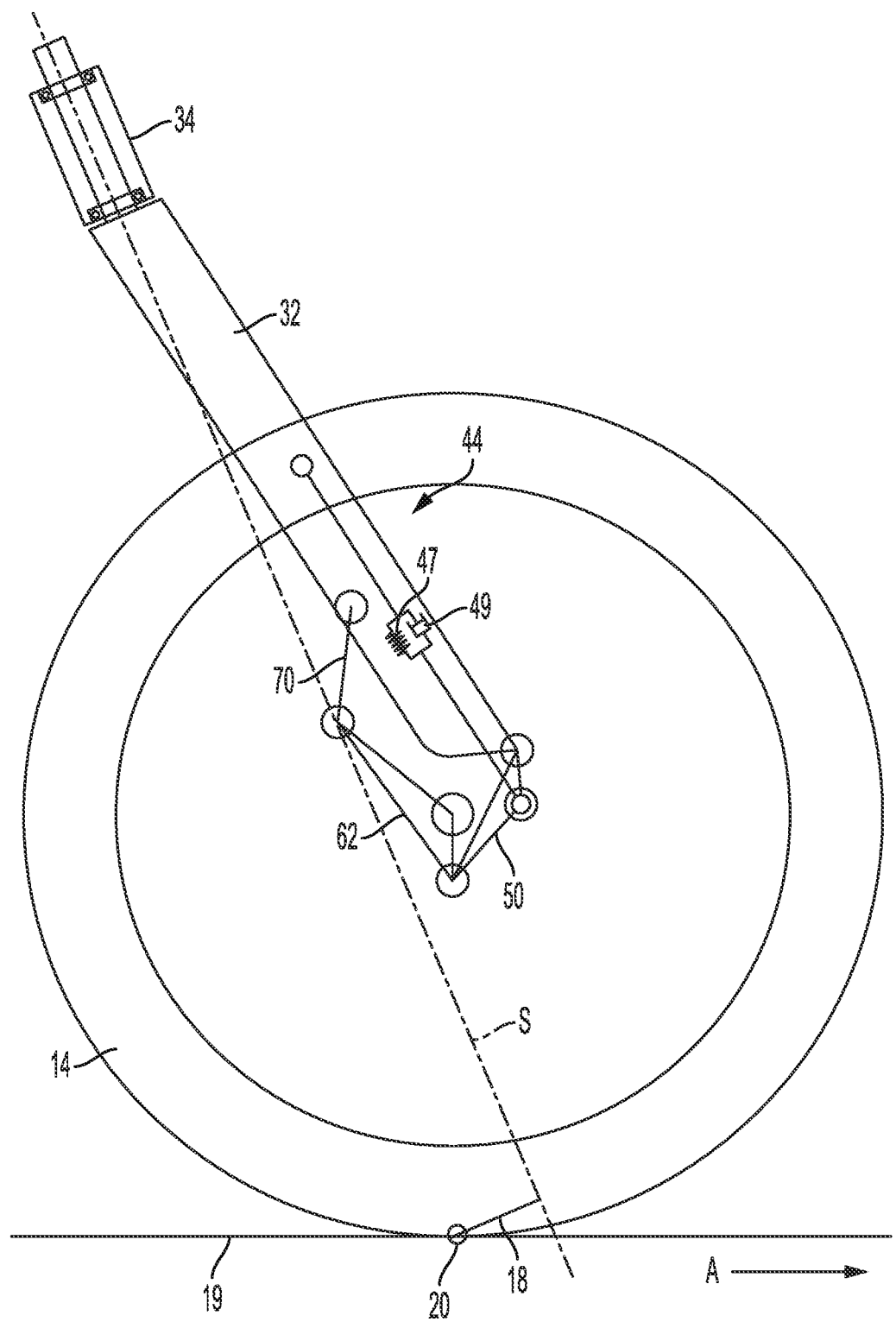
FIG. 5 is a side schematic view of an alternate embodiment of a wheel suspension assembly constructed according to the teachings of the disclosure.

FIG. 5 illustrates the wheel suspension assembly in engineering symbols that distinguish a spring 47 and dashpot 49 of the shock absorber 44.

Returning now to FIGS. 2-4, the control link 70 is pivotably mounted to the first arm 32 at the first arm control pivot 76 that is located between the first arm fixed pivot 40 and the first arm shock pivot 42, along a length of the first arm 32.

Figure 6:
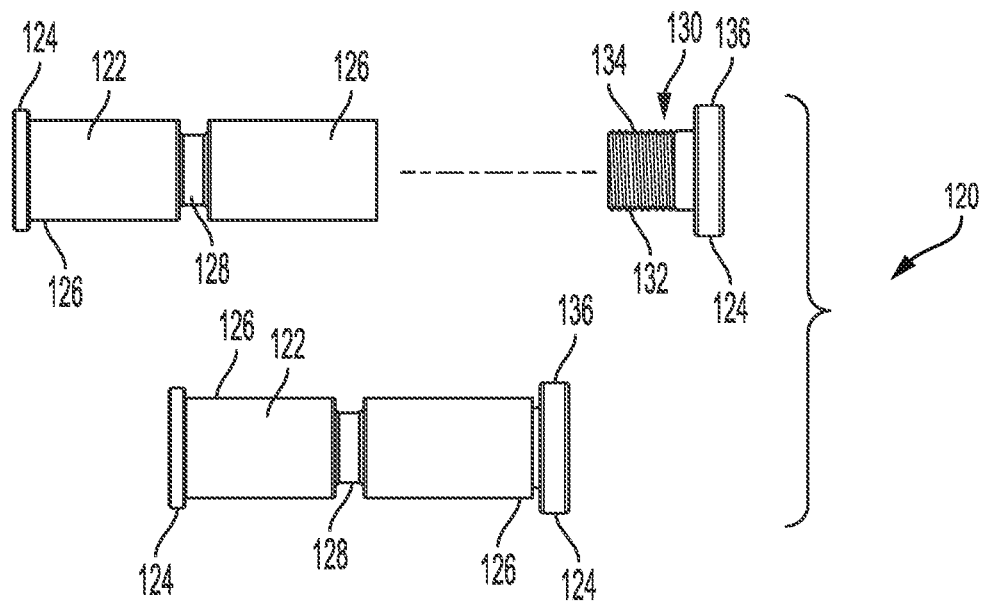
FIG. 6 is a side elevational view of an example pivot rod assembly including exploded and assembled configurations constructed according to the teachings of the disclosure.

Turning now to FIG. 6, an example pivot rod assembly 120 is described that can advantageously be utilized in any of the above pivots 40, 42, 52, 54, 60, 64, 66, 72, 74, 76 for the front suspension assembly 46, as well as any or all pivots for the rear suspension assembly 24. The pivot rod assembly 120 can include various subcomponents arranged to connect links 26 to each other or to a frame or fork member 12, 30.

The pivot rod assembly 120 includes a central rod portion 122 with flanges or caps 124 extending outwardly from or adjacent to ends 126 of the rod portion 122. The pivot rod assembly 120 further includes an opening 128, which can be a slot, recess, bore, or the like, disposed in an intermediate position of the rod portion 122. In the illustrated form, the recess 128 has an annular configuration extending around a circumference of the rod portion 122. In some versions, the flange 124 can be integral with one of the ends 126 of the rod portion 122. As shown, the flange 124 can have an annular configuration that extends radially outwardly from the end 126 of the rod portion 122. On the other side of the rod portion 122, the flange 124 can be provided by a bolt 130 configured to removably couple to the end 126 of the rod portion 122.

Figure 7:
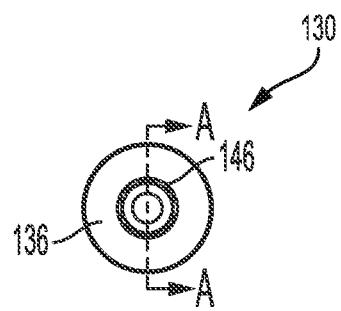
FIG. 7 is a side elevational view of one end of the pivot rod assembly of FIG. 6.
Figures 8, 9:
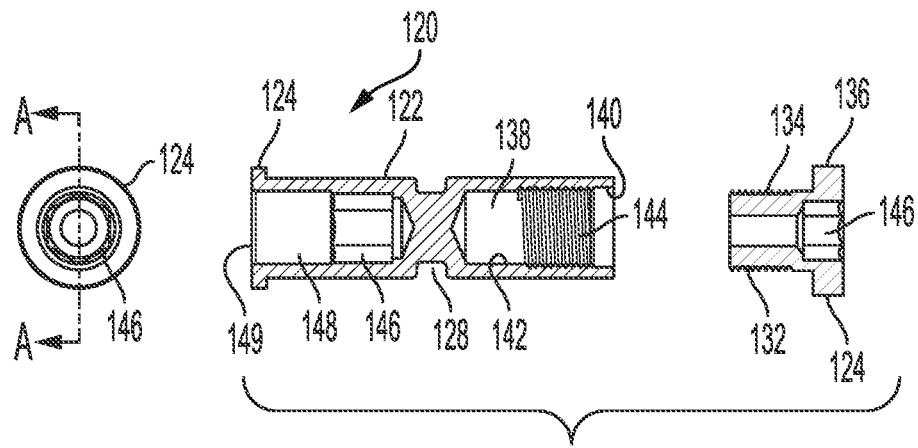
FIG. 8 is a side elevational view of another end of the pivot rod assembly of FIG. 6.
FIG. 9 is a cross-sectional view of the pivot rod assembly of FIG. 6 taken along the line A-A in FIGS. 7 and 8.

As shown in FIGS. 7-9, the bolt 130 can include a shaft portion 132 with a locking mechanism 134 and an annular cap 136. The annular cap 136 can have a diameter larger than the rod portion 122 and/or generally equal to a diameter of the annular flange 124. The end 126 of the rod portion 122 can include an internal cavity 138 having a longitudinally oriented opening 140. In one form, the locking mechanism 134 can be an external thread 134 extending around the shaft portion 132. In another form, the locking mechanism 134 can be a bayonet pin. Other locking mechanisms are possible. The cavity 138 can include a locking mechanism 144 configured to couple to the shaft locking mechanism 134. For example, an interior surface 142 of the cavity 138 can include an internal thread 144 configured to mate with the thread 134 of the bolt 130 to secure the bolt 130 to the rod portion 122. In another example, the cavity 138 can include a slot to receive the bayonet pin.

The pivot rod assembly 120 can further include internal tool interfaces 146 on either side thereof to connect with a tool to aid a user in assembling the components together by rotating the bolt 130 and rod portion 122 with respect to one another. The tool interfaces 146 can take any suitable form, including a hexagon coupling as shown, as well as square, pentagon, heptagon, octagon, and other polygons, star configurations, flathead, Phillips, and so forth. Similarly, the tool interfaces 146 can be fashioned to work with any kind of driver such as but not limited to a hex, torx, phillips head, flat head, nut, safety screw head, or other types of tool interfaces designed to transmit rotary motion and or torque between a tool and a fastener.

One of the tool interfaces 146 can be provided in the bolt 130, while the other of the tool interfaces 146 can be provided in an internal cavity 148 extending into the rod portion 122 and having a longitudinally oriented opening 149. As shown in FIG. 9, the cavities 138, 148 can extend a majority of the length of the rod portion 122 and, in some versions over 75% of the length, to reduce the overall weight of the pivot rod assembly 120. In such versions, the tool interface 146 and the internal thread 144 can extend along some of the length of the cavities 138, 148 as shown or substantially all of the length of the cavities 138, 148.

With this configuration, a user can insert tools into the tool interfaces 146 on either end of the pivot rod assembly 120 and secure the bolt 130 to the rod portion 122 via the threading 134, 144. The cap 136 of the bolt 130 and the flange 124 at the other end 126 of the rod portion 122 can thereby provide an axial clamping force therebetween. Although the rod portion 122 is shown with a single piece construction, multiple components can be secured together to provide the structure shown. Additionally, rather than an integral flange 124, both ends of the pivot rod assembly can be provided by bolts 130 configured as described above (FIG. 14). With this configuration, the caps 136 of the bolts 130 can provide an axial clamping force therebetween when secured to the rod portion 122.

Pivot assemblies 150 as described herein advantageously include a retention feature to restrict axial movement of the rod portion 122 when installed as described in more detail below. More specifically, the pivot assemblies 150 can include a pin 152 configured to be inserted at least partially into the slot 128 to thereby restrict movement of the rod portion 122 in an axial direction A. This restricts the rod portion 122 from being able to disassemble in the direction of a wheel 14, 16.

Example pins 152 are shown in FIGS. 10A-10G. With each example design, the pin 152 includes an elongate body 154 with a distal end 156 configured to be inserted into the pivot assembly 150 and an opposite, proximal end 158. Each pin 152 is configured to be inserted into and stay within the pivot assembly 150 during use, but also be removable when the pivot assembly 150 needs to be disassembled.

The pin 152 can take any suitable form. For example, the pin 152 can be straight, bent, threaded, partially threaded, fluted, or combinations thereof. Further, the pin 152 can include features that are useful to help keep the pin 152 in place during use by adding friction between the opening 128 fashioned to receive the pin 152, described in more detail below, and the pin 152 itself. In other forms, the pin 152 can be deformable in a way to allow the user to bend the pin 152 to restrict its removal without straightening.

Figure 10A:
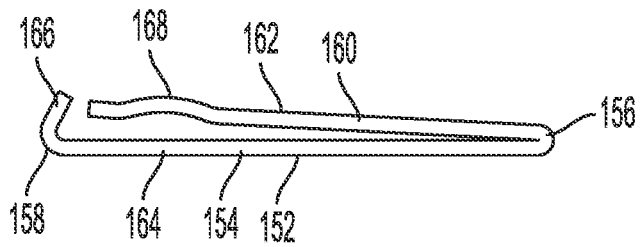
FIGS. 10A-10G are side elevationals views of example pin designs for suspension assemblies constructed according to the teachings of the disclosure.
Figure 10B:
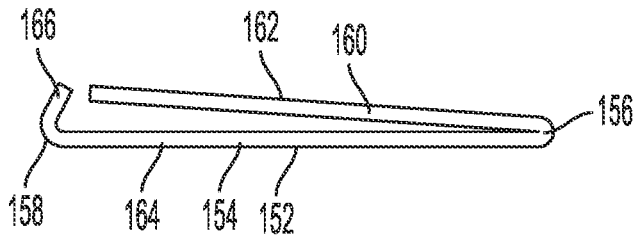

In first forms as shown in FIGS. 10A and 10B, the elongate body 154 includes a member 160 bent at the distal end 156 to form a shorter leg 162 and longer leg 164 with a hooked end 166. As shown, the shorter and longer legs 162, 164 taper away from one another from the distal end 156 to the proximal end 158. This configuration allows the legs 162, 164 to be deflected inwardly as the pin 152 is inserted into the pivot assembly 150 with friction and compression aiding in holding the pin 152 within the pivot assembly 150. In the version of FIG. 10A, the shorter leg 162 includes a scalloped or outwardly curved portion 168 further extending the width of the elongate body 154 adjacent the proximal end 158 thereof. Alternatively, as shown in FIG. 10B, the shorter leg 162 can have a straight configuration.

Figure 10C:
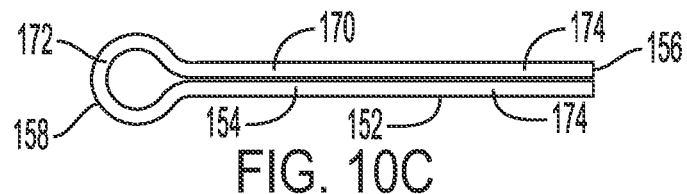

In another form as shown in FIG. 10C, the elongate body 154 includes a member 170 bent to form a head 172 at the proximal end 158 with two legs 174 beginning together adjacent the head 172 and extending away therefrom in generally parallel directions.

Figure 10D:
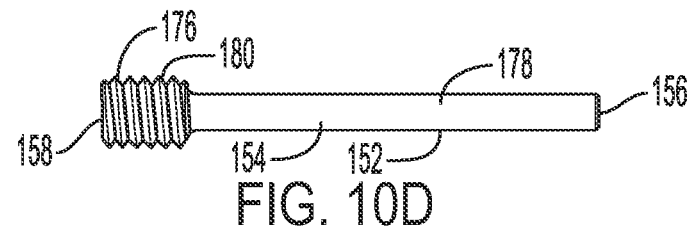
Figure 10E:
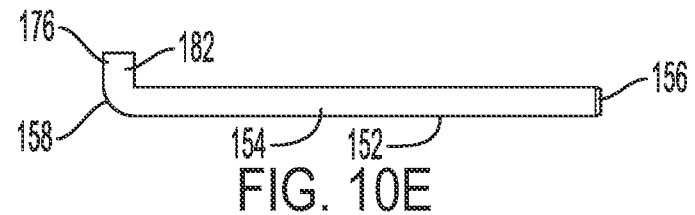

In other forms as shown in FIGS. 10D and 10E, the elongate body 154 includes a head 176 at the proximal end 158 and a shaft portion 178 extending from the head 176 to the distal end 156. The shaft portion 178 can have any desired cross-section, such as circular, oval, rectangular, and so forth. In the version of FIG. 10D, the head 176 has an increased diameter with respect to the shaft portion 178 and includes an external thread 180 extending therearound. As with the above bolt 130, the head 176 can include a tool interface to screw the pin 152 into the pivot assembly 150. Alternatively, the head 176 can be a bent portion 182 of the shaft 178, extending generally perpendicular with respect thereto as shown. The bent portion 182 can also extend at an acute angle or obtuse angle if desired.

Figure 10F:
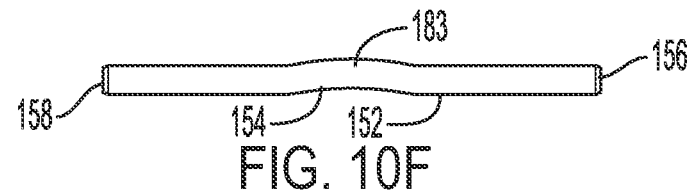
Figure 10G:
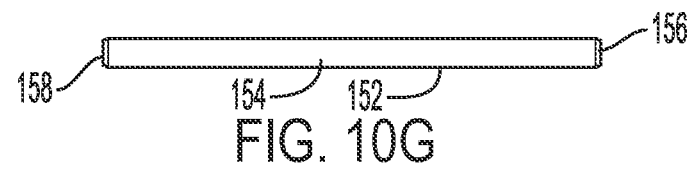

In the examples of FIGS. 10F and 10G, the elongate gate 154 can be a shaft extending along an axis and, optionally, the shaft can include a scalloped out outwardly curved portion 183.

A first example pivot assembly 150 is shown in FIG. 11. The pivot assembly 150 includes a frame member 184 coupled to the frame 12 or fork 30 with an inner pivot portion 186 and a link 26 having an end providing outer pivot portions 188 disposed laterally outwardly of the inner pivot portion 186 of the frame member 184. Each of the inner and outer pivot portions 186, 188 include a lateral bore or journal 190 (FIGS. 12-14) sized to receive the rod portion 122 of the pivot rod assembly 120 therethrough. As discussed above, the pivot rod assembly 120 can be assembled by inserting the rod portion 122 through the bores 190 and coupling the bolt 130 to the rod portion 122 so that the cap 136 of the bolt 130 and the flange 124 at the other end 126 of the rod portion 122 (or the caps 136 of the bolts 130) provide an axial clamping force on the frame member 184 and link 26 therebetween.

In an alternative form, the inner pivot portion 186 can be provided by the link 26 and the outer pivot portions 188 can be provided by the frame member 184. Further, it will be understood that the frame member 184 can be secured to the frame 12 or fork 30 by any suitable method, such as welding, fasteners, or the like, or can be integral with the frame 12 or fork 30.

Further details of the pivot assembly 150 are shown in the cross-section examples illustrated in FIGS. 12-14. The pivot assemblies 150 are shown with a combined cross-section where the frame member 184 and the link 26 cross-section is taken along the line B-B in FIG. 11 which is offset from the center of the lateral bores 190 to a location spaced closely adjacent to a tangent to the lateral bores 190, while the pivot rod assemblies 120 cross-section is taken along the generally central line A-A in FIGS. 7 and 8. The combined cross-section advantageously shows the features of the pivot rod assembly 120 discussed above, as well as a retention feature 192 of the pivot assembly 150 including a pin bore 194 extending through the inner pivot portion 186 and the pin 152. As shown, the pin bore 194 extends through the inner pivot portion 186 along an axis so that the pin bore 194 opens into a radial space of the lateral bore 190. The pin bore 194 can stop with the intersection of the lateral bore 190 or can extend therethrough to open on an opposite side of the inner pivot portion 186 as shown in FIGS. 12-14. If desired, the pin bore 194 can include an expanded recess 198 at a proximal end thereof to accommodate a head of the pin 152 when the pin 152 is fully inserted into the pin bore 194.

FIGS. 12-14 illustrate different example configurations for the pivot assembly 150 with regard to the example pivot rod assemblies 120 discussed above and with respect to the wheel 14. For example, as shown in FIG. 12, the pivot rod assembly 120 can be disposed so that the bolt 130 is positioned adjacent to the wheel 14. By another approach as shown in FIG. 13, the rod portion 122 with the integral flange 124 can be positioned adjacent to the wheel 14. In a third approach as shown in FIG. 14, the pivot rod assembly 120 can include two bolts 130 that are secured to the rod portion 122 on both sides of the pivot assembly 150 using any suitable locking mechanism, such as threads as shown, a bayonet pin, etc.

Figure 15:
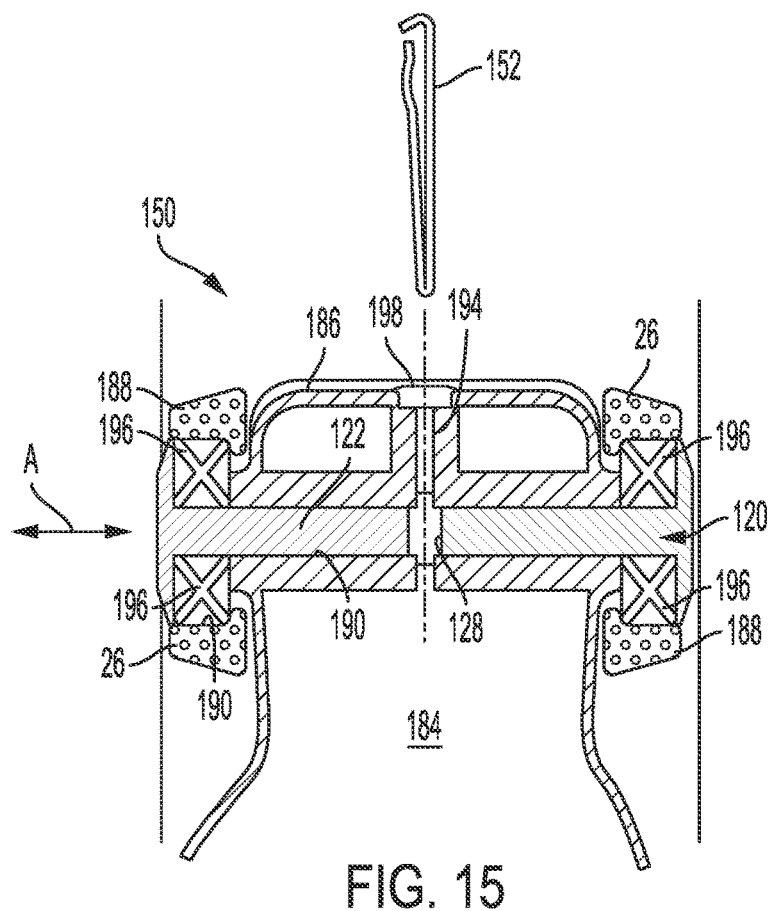
FIG. 15 is a cross-sectional view of the first example suspension pivot assembly of FIG. 11 taken along the line B-B with a pivot rod assembly disposed therein showing a pin in an exploded position.
Figure 16:
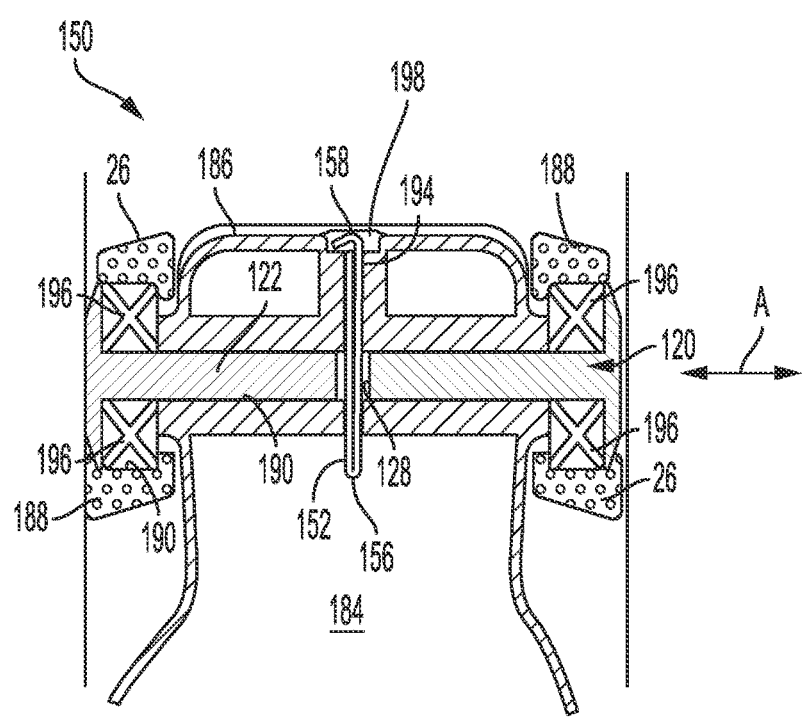
FIG. 16 is a cross-sectional view of the first example suspension pivot assembly of FIG. 11 taken along the line B-B with a pivot rod assembly disposed therein showing a pin in an inserted, retention position.

FIGS. 15 and 16 illustrate the pivot assembly 150 with the pivot rod assembly 120 assembled therein and the cross-section of entire pivot assembly 150 taken along the line B-B in FIG. 11. As shown, when the rod portion 122 is disposed within the bore 190 and the pivot rod assembly components are secured together, the recess 128 of the rod portion 122 is aligned with the pin bore 194. The pivot assembly 120 can position one or more bearings 196 in radial and axial directions so that the frame member 184 and link 26 can articulate about the pivot assembly 120. So configured, a user can then align the pin 152 with the pin bore 194 as shown in FIG. 15 and insert the pin 152 into the pin bore 194 as shown in FIG. 16. In the illustrated form, the pin 152 has the configuration as shown in the example of FIG. 10A. The pin bore 194 can be sized with a width to deflect the legs 162, 164 together as shown to retain the pin 152 within the pin bore 194 during use. As discussed above, the pin 152 can also or alternatively be configured to secure to threading within the pin bore 194, a user can bend or otherwise manipulate the proximal or distal end 158, 156 of the pin 152, or to have other suitable configurations to retain the pin 152 within the pin bore 194.

Figure 17:
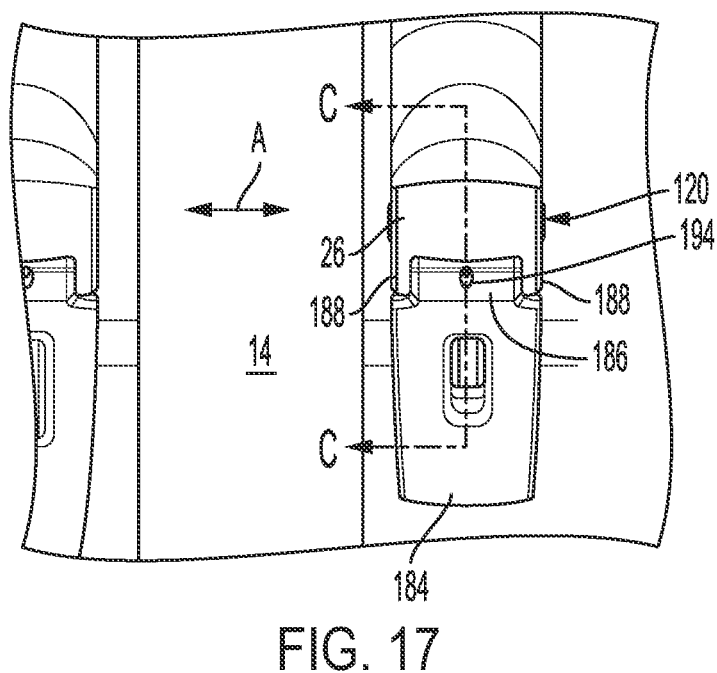
FIG. 17 is a sectional top view of the first example suspension pivot assembly of FIG. 11.
Figure 18:
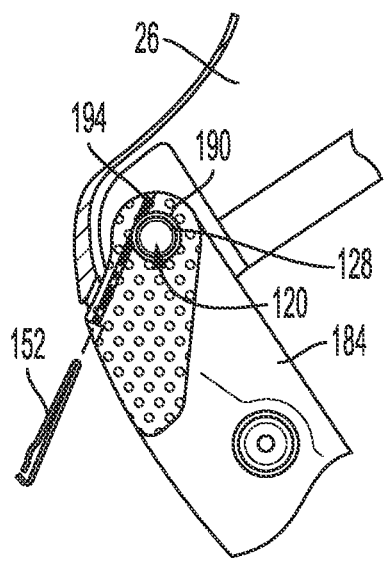
FIG. 18 is a cross-sectional view of the first example suspension pivot assembly taken along the line C-C in FIG. 17 showing a pin in an exploded position.
Figure 19:
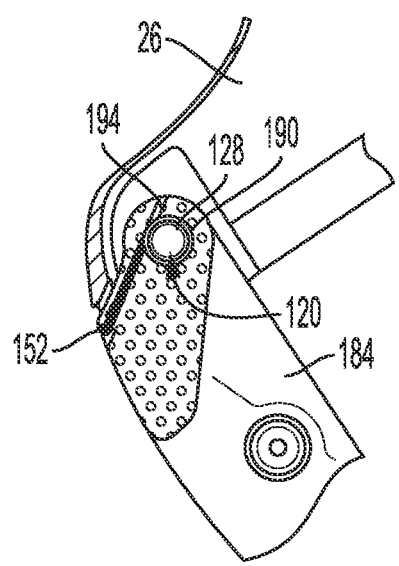
FIG. 19 is a cross-sectional view of the first example suspension pivot assembly taken along the line C-C in FIG. 17 showing a pin in an inserted, retention position.
Figure 20:
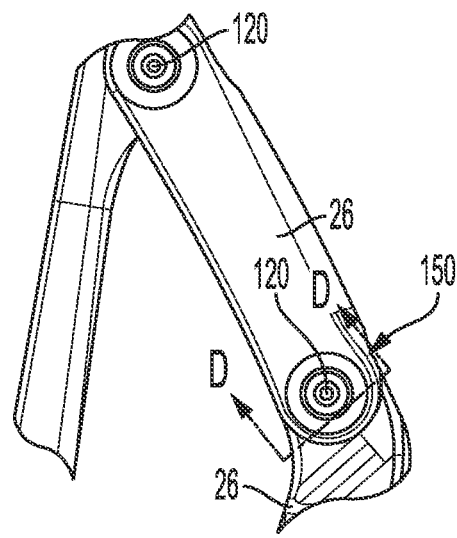
FIG. 20 is a sectional side view of a second example suspension pivot assembly constructed according to the teachings of the disclosure.

FIGS. 17-19 provide alternate views of the assembled pivot assembly 150. FIG. 17 shows the pivot assembly 120 from a top view with the wheel 14 disposed adjacent thereto. Further, FIGS. 18 and 19 show a cross-section of the pivot assembly 150 in a plane generally perpendicular to the bore 190 to show the pin 152 in an aligned position with the pin bore 194 and an inserted, retention position within the pin bore 194.

Second and third example floating pivot assemblies 150 are shown in FIGS. 20-25. The pivot assemblies 150 of these forms include a link 26 having the inner pivot portion 186 and a link 26 having an end providing the outer pivot portions 188 disposed laterally outwardly of the inner pivot portion 186. Each of the inner and outer pivot portions 186, 188 include a lateral bore or journal 190 (FIGS. 21, 22, 24, 25) sized to receive the rod portion 122 of the pivot rod assembly 120 therethrough. As discussed above, the pivot rod assembly 120 can be assembled by inserting the rod portion 122 through the bores 190 and coupling the bolt 130 to the rod portion 122 so that the cap 136 of the bolt 130 and the flange 124 at the other end 126 of the rod portion 122 (or the caps 136 of the bolts 130) provide an axial clamping force on the links 26 therebetween. One of the links 26 can alternatively be replaced by a frame member of the frame 12 or fork 30, as described above.

Figure 21:
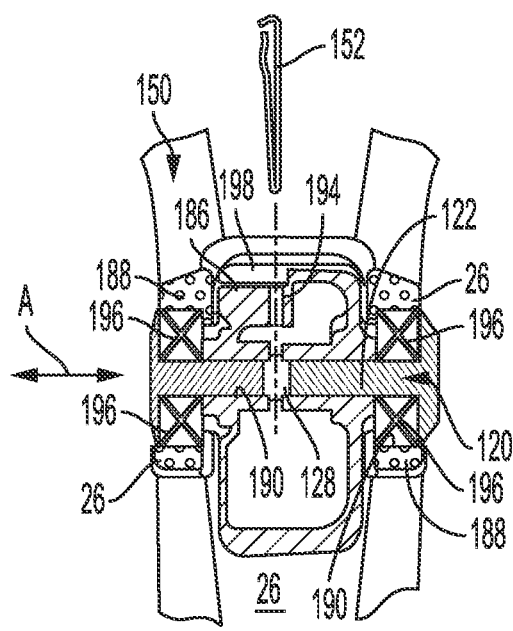
FIG. 21 is a cross-sectional view of the second example suspension pivot assembly of FIG. 20 taken along the line D-D with a pivot rod assembly disposed therein showing a pin in an exploded position.
Figure 22:
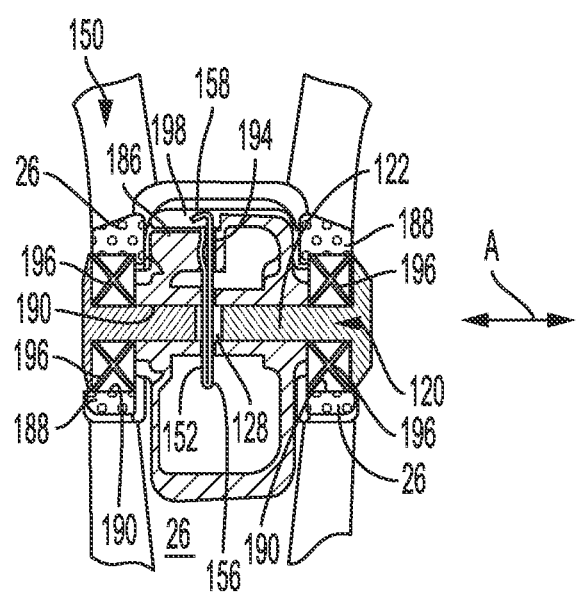
FIG. 22 is a cross-sectional view of the second example suspension pivot assembly of FIG. 20 taken along the line D-D with a pivot rod assembly disposed therein showing a pin in an inserted, retention position.
Figure 23:
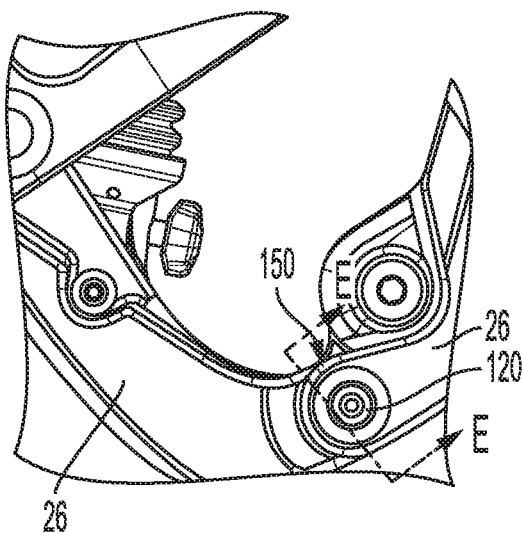
FIG. 23 is a sectional side view of a third example suspension pivot assembly constructed according to the teachings of the disclosure.
Figure 24:
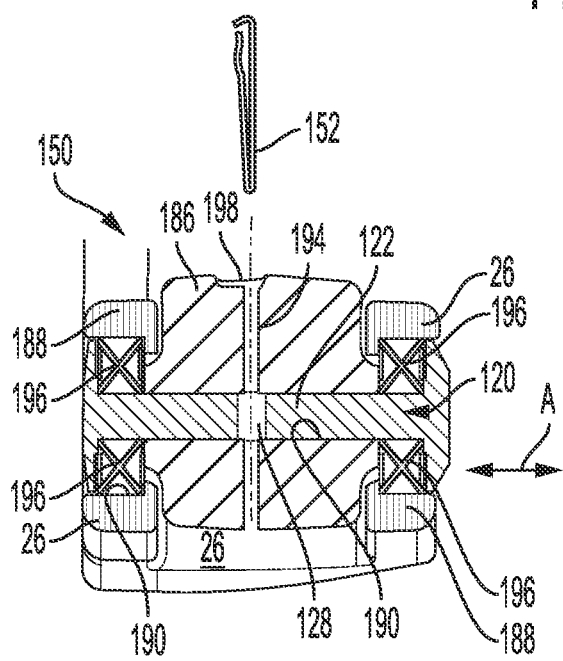
FIG. 24 is a cross-sectional view of the third example suspension pivot assembly of FIG. 23 taken along the line E-E with a pivot rod assembly disposed therein showing a pin in an exploded position.
Figure 25:
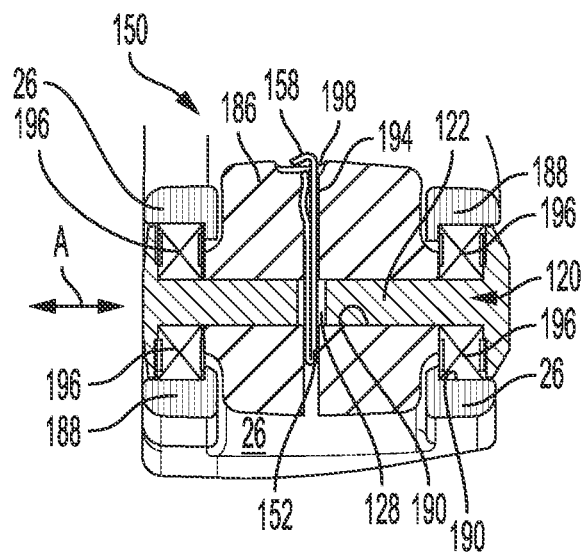
FIG. 25 is a cross-sectional view of the third example suspension pivot assembly of FIG. 23 taken along the line E-E with a pivot rod assembly disposed therein showing a pin in an inserted, retention position.

Further details of the pivot assemblies 150 of these forms are shown in the cross-section examples illustrated in FIGS. 21, 22, 24, and 25. The pivot assemblies 150 are shown with the pivot rod assembly 120 assembled therein and the cross-section of entire pivot assembly 150 taken along the line D-D in FIG. 20 for FIGS. 21 and 22 and along the line E-E in FIG. 23 for FIGS. 24 and 25. The pivot assembly 120 can position one or more bearings 196 in radial and axial directions so that the links 26 can articulate about the pivot assembly 120. As shown, when the rod portion 122 is disposed within the bore 190 and the pivot rod assembly components are secured together, the recess 128 of the rod portion 122 is aligned with the pin bore 194. So configured, a user can then align the pin 152 with the pin bore 194 as shown in FIGS. 21 and 24 and insert the pin 152 into the pin bore 194 as shown in FIGS. 22 and 25. In the illustrated form, the pin 152 has the configuration as shown in the example of FIG. 10A. As such, the pin bore 194 can be sized with a width to deflect the legs 162, 164 together as shown to retain the pin 152 within the pin bore 194 during use. As discussed above, the pin 152 can also or alternatively be configured to secure to threading within the pin bore 194, a user can bend or otherwise manipulate the proximal or distal end 158, 156 of the pin 152, or other suitable configurations to retain the pin 152 within the pin bore 194.

With the pin 152 disposed within the pin bore 194, the pin 152 at least partially extends through the recess 128 of the rod portion 122 with adjacent portions of the pin 152 restricted from lateral movement by the inner pivot portion 186. Accordingly, with this configuration, the pin 152 interfaces with side surfaces of the recess 128 and the inner pivot portion 186 concurrently to restrict lateral movement of the rod portion 122 in the axial direction A, so that even if the pivot rod assembly 120 self disassembles during use of the cycle 10, the pin 152 restricts the rod portion 122 from laterally moving out of the lateral bore 190 and possibly into a path of the wheel 14. Accordingly, the pivot assembly 150 provides the benefit of a suspension assembly 24, 46, while also protecting a rider of the cycle 10 from an unintentional auto-disassembly of the pivot rod assembly 120 in an axial direction A during use by restricting the rod portion 122 from contacting a wheel opening 98 or other rotating component 90, 92, 94, 96. As such, the rider is protected against the wheel rotation stopping without warning due to unintentional auto-disassembly. The recess 128 can have a width generally equal to, narrower, or wider than a width of the pin bore 194. In the installed state, where the pivot assembly 150 is fully assembled, the recess 128 can be symmetric or asymmetric about the pin bore 194. Further, while an annular recess 128 is described herein due to the convenience of any orientation of the rod portion 122 aligning the recess 128 with the pin bore 194, the recess 128 can alternatively extend through radial portions of the rod portion 122, can be a bore or opening extending into or through the rod portion 122, can have varying widths, and so forth.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A pivot assembly for a cycle linkage suspension, the pivot assembly comprising:
   first and second members each including a lateral opening extending therethrough, wherein one of the first or second members includes a pin bore that at least partially intersects the lateral opening of the one of the first or second members;
   a pivot including a rod portion configured to be disposed within the lateral openings of the first and second members to pivotably couple the first and second members together about an axis of the rod portion;
   in the rod portion further including a recess extending at least partially around an intermediate portion thereof;
   the pivot further including a first flange removably coupleable to the rod portion, and a second flange removably coupleable to, permanently coupled to, or formed as a part of the rod portion, wherein the first flange and the second flange are configured to provide an axial clamping force therebetween to secure the rod portion with respect to the one of the first or second members in a position that aligns the recess with the pin bore along a lateral direction; and
   a pin configured to be removably inserted at least partially into the pin bore and the recess of the rod portion in an inserted position to restrict lateral movement of the rod portion within the first and second members in the event of a loss of the axial clamping force between the first flange and the second flange, wherein the recess is shaped such that the pin can be inserted into the inserted position with the rod portion in any one of a plurality of angular positions about the axis of the rod portion with respect to the one of the first or second members.

2. The pivot assembly of claim 1, wherein the recess extends annularly completely around the intermediate portion of the rod portion.

3. The pivot assembly of claim 1, wherein the first member comprises a link and the second member comprises a frame member.

4. The pivot assembly of claim 1, wherein the first and second members comprise links.

5. The pivot assembly of claim 1, wherein the first member includes an inner pivot portion and the second member comprises outer pivot portions configured to receive the inner pivot portion of the first member therebetween.

6. The pivot assembly of claim 1, wherein an axis of the pin bore is offset from an axis of the lateral opening of the one of the first or second members.

7. The pivot assembly of claim 1, wherein the pin bore extends entirely through the one of the first or second members such that a distal end of the pin projects through a distal opening of the pin bore in the inserted position.

8. The pivot assembly of claim 1, wherein the second flange comprises an annular flange integral with the rod portion at one end thereof, and wherein the pivot further comprises a bolt having an annular cap and a shaft, the annular cap comprising the first flange.

9. The pivot assembly of claim 8, wherein at least one of the rod portion or the bolt includes a tool interface.

10. The pivot assembly of claim 1, wherein the pivot further comprises a first bolt and a second bolt each having an annular cap and a shaft, the shaft of the first bolt configured to secure to a first end of the rod portion, the shaft of the second bolt configured to secure to a second end of the rod portion, wherein the annular cap of the first bolt comprises the first flange and the annular cap of the second bolt comprises the second flange.

11. The pivot assembly of claim 10, wherein at least one of the first bolt and the second bolt includes a tool interface.

12. The pivot assembly of claim 1, wherein the pin comprises one or more of: a deflectable portion; a bendable portion, a scalloped portion; a threaded portion; or a bent portion.

13. The pivot assembly of claim 1, further comprising a wheel carrier coupled to one of the first or second members.

14. The pivot assembly of claim 1, further comprising a fork; and wherein the first and second members comprise links in a front linkage suspension pivotably coupled to the fork; and one of the first and second members comprise a front wheel carrier such that the front linkage suspension is configured to operably couple a front wheel to the fork.

15. The pivot assembly of claim 1, further comprising a frame; and wherein the first and second members comprise links in a rear linkage suspension pivotably coupled to the frame; and one of the first and second members comprise a rear wheel carrier such that the rear linkage suspension is configured to operably couple a rear wheel to the frame.

16. A front linkage suspension for a cycle, the front linkage suspension comprising:
a fork;
a plurality of links; and
pivot assemblies rotatably coupling the plurality of links together and to the fork at pivot couplings, the pivot assemblies comprising:
a pivot including a rod portion;
the rod portion including a recess extending at least partially around an intermediate portion thereof;
the pivot further including a first flange removably coupleable to the rod portion, and a second flange removably coupleable to, permanently coupled to, or formed as a part of the rod portion, wherein the first flange and the second flange are configured to provide an axial clamping force therebetween to secure the rod portion with respect to one of the plurality of links or the fork in a position that aligns the recess with a pin bore in the one of the plurality of links or the fork along a lateral direction; and
a pin configured to be removably inserted at least partially into the pin bore and the recess of the rod portion in an inserted position to restrict lateral movement of the rod portion in the event of a loss of the axial clamping force between the first flange and the second flange,
wherein the recess is shaped such that the pin can be inserted into the inserted position with the rod portion in any one of a plurality of angular positions about an axis of the rod portion with respect to the one of the plurality of links or the fork; and
a suspension device operably coupled to the fork and one of the plurality of links.

17. The front linkage suspension of claim 16, wherein the plurality of links comprises first, second, and third links, the first and third links pivotably coupled to the fork and the second link pivotably coupled between the first and third links.

18. The front linkage suspension of claim 16, wherein the recess extends annularly completely around the intermediate portion of the rod portion.

19. A rear linkage suspension for a cycle, the rear linkage suspension comprising:
a cycle frame;
a plurality of links; and
pivot assemblies rotatably coupling ends of the plurality of links together and to the cycle frame at pivot couplings, the pivot assemblies comprising:
a pivot including a rod portion;
the rod portion including a recess extending at least partially around an intermediate portion thereof;
the pivot further including a first flange removably coupleable to the rod portion, and a second flange removably coupleable to, permanently coupled to, or formed as a part of the rod portion, wherein the first flange and the second flange are configured to provide an axial clamping force therebetween to secure the rod portion with respect to one of the plurality of links or the cycle frame in a position that aligns the recess with a pin bore in the one of the plurality of links or the cycle frame along a lateral direction; and
a pin configured to be removably inserted at least partially into the pin bore and the recess of the rod portion in an inserted position to restrict lateral movement of the rod portion in the event of a loss of the axial clamping force between the first flange and the second flange,
wherein the recess is shaped such that the pin can be inserted into the inserted position with the rod portion in any one of a plurality of angular positions about an axis of the rod portion with respect to the one of the plurality of links or the cycle frame; and wherein one of the plurality of links comprises a suspension device.

20. The rear linkage suspension of claim 19, wherein the recess extends annularly completely around the intermediate portion of the rod portion.

* * * * *

UNITED STATES PATENT AND TRADEMARK OFFICE
CERTIFICATE OF CORRECTION

| | |
|---|---|
| PATENT NO. | : 11,208,172 B2 |
| APPLICATION NO. | : 16/153396 |
| DATED | : December 28, 2021 |
| INVENTOR(S) | : David Weagle |

It is certified that error appears in the above-identified patent and that said Letters Patent is hereby corrected as shown below:

In the Claims

Column 16, Line 55, Claim 1, delete "in the" and insert --the--.

Signed and Sealed this
Nineteenth Day of April, 2022

Katherine Kelly Vidal
*Director of the United States Patent and Trademark Office*